US012259681B2

(12) United States Patent
Zhu et al.

(10) Patent No.: US 12,259,681 B2
(45) Date of Patent: Mar. 25, 2025

(54) ELECTROPHOTOGRAPHIC PHOTOCONDUCTOR, METHOD OF MANUFACTURING THE SAME, AND ELECTROPHOTOGRAPHIC APPARATUS

(71) Applicant: FUJI ELECTRIC CO., LTD., Kawasaki (JP)

(72) Inventors: Fengqiang Zhu, Nagano (JP); Shinjiro Suzuki, Nagano (JP); Masaru Takeuchi, Nagano (JP); Kazuki Nebashi, Nagano (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 574 days.

(21) Appl. No.: 17/567,880

(22) Filed: Jan. 3, 2022

(65) Prior Publication Data

US 2022/0260934 A1 Aug. 18, 2022

(30) Foreign Application Priority Data

Feb. 15, 2021 (JP) ................................ 2021-022110

(51) Int. Cl.

*G03G 5/14* (2006.01)
*G03G 5/05* (2006.01)

(52) U.S. Cl.

CPC ........... *G03G 5/142* (2013.01); *G03G 5/0525* (2013.01); *G03G 5/0567* (2013.01)

(58) Field of Classification Search

CPC ..... G03G 5/142; G03G 5/0525; G03G 5/0567
See application file for complete search history.

(56) References Cited

U.S. PATENT DOCUMENTS 6,300,026 B1 * 10/2001 Yamazaki .............. G03G 5/043
430/59.4
2015/0004534 A1 1/2015 Kaku et al.
(Continued)

FOREIGN PATENT DOCUMENTS

JP 2004020727 A 1/2004
JP 2008299020 A 12/2008
(Continued)

OTHER PUBLICATIONS

English machine translation of the description of JP-2018115098-A (Year: 2018).*

*Primary Examiner* — Peter L Vajda
*Assistant Examiner* — Boone Alexander Evans
(74) *Attorney, Agent, or Firm* — Rabin & Berdo, P.C.

(57) ABSTRACT

Provided are an electrophotographic photoconductor that is less likely to cause transfer ghosting even when mounted in an electrophotographic apparatus with high transfer voltage set for high-speed or cleanerless processes, as well as a method of manufacturing the electrophotographic photoconductor, and an electrophotographic apparatus. The electrophotographic photoconductor includes a conductive substrate; an undercoat layer provided on the conductive substrate, and a photosensitive layer provided on the undercoat layer. In the electrophotographic photoconductor, the undercoat layer contains a resin binder and a first filler; and the first filler contains zinc oxide particles that are surface-treated with an N-acylated amino acid or an N-acylated amino acid salt.

10 Claims, 3 Drawing Sheets

(56) References Cited

U.S. PATENT DOCUMENTS

| | | | |
|---|---|---|---|
| 2016/0154329 A1 | 6/2016 | Kawaguchi et al. | |
| 2016/0231659 A1* | 8/2016 | Tanaka | G03G 5/144 |
| 2019/0163077 A1* | 5/2019 | Takeuchi | G03G 5/0696 |

FOREIGN PATENT DOCUMENTS

| | | | |
|---|---|---|---|
| JP | 2013137527 A | | 7/2013 |
| JP | 2016110127 A | | 6/2016 |
| JP | 2018115098 A | * | 7/2018 |

* cited by examiner

ELECTROPHOTOGRAPHIC PHOTOCONDUCTOR, METHOD OF MANUFACTURING THE SAME, AND ELECTROPHOTOGRAPHIC APPARATUS

CROSS-REFERENCE TO A RELATED APPLICATION

This non-provisional Application for a U.S. Patent claims the benefit of priority of JP 2021-022110 filed Feb. 15, 2021, DAS code No. EA3C, the entire content of which is hereby incorporated by reference.

TECHNICAL FIELD

The present invention relates to electrophotographic photoconductors (hereinafter also simply referred to as "photoconductors"), methods of manufacturing the same, and electrophotographic apparatuses equipped with the photoconductors.

BACKGROUND ART

Recently, electrophotographic image forming methods are widely applied to electrophotographic apparatus, including copiers, printers, plotters, and digital-image multi-function machines with these functions combined for office use, as well as small printers and facsimile transceivers for personal use. Organic photoconductors (OPCs) using organic materials are commonly used as photoreceptors for such various electrophotographic apparatus.

Known organic photoconductors include functionally-separated photoconductors and single-layer photoconductors. Functionally-separated photoconductors include, on a conductive substrate such as aluminum, an undercoat layer including an anodic oxide film or a resin film, a charge generation layer with a photoconductive organic pigment such as phthalocyanine or an azo pigment dispersed in the resin, a charge transport layer with a molecule having a substructure involved in charge hopping conduction such as amine or hydrazone coupled with a pi-electron conjugated system dissolved in the resin, and as necessary, a protective layer, which are stacked in this order. Single-layer photoconductors include a single photosensitive layer having both charge generation and transport functions instead of the charge generation layer and the charge transport layer, as necessary, on an undercoat layer.

An electrophotographic process includes charging, exposure, development, and transfer. In the charging process, a photoconductor is charged to several hundred V. Then, in the exposure process, a latent image is formed on the surface of the photoconductor. Then, in the developing process, the latent image is developed by toner. Finally, in the transfer process, the toner is transferred to a medium, and an image is obtained on the medium.

Among recent electrophotographic apparatus, digital machines have become dominant. In digital machines, information such as images and text that has been digitized and converted to optical signals is light-irradiated to a charged photoconductor using a monochromatic light source, such as argon laser, helium-neon laser, semiconductor laser, or a light-emitting diode, as an exposure light source in the exposure and developing processes to form an electrostatic latent image on the surface of the photoconductor, which is then visualized with toner.

Methods for charging a photoconductor include non-contact charging systems, in which a charging member, such as a scorotron, is not in contact with a photoconductor; and contact charging systems, in which a charging member, using a semiconductive rubber roller or brush, is in contact with a photoconductor. The contact charging systems have the advantage that less ozone is generated due to occurrence of corona discharge in close proximity to the photoconductor so that voltage to be applied can be lower, as compared to the non-contact charging systems. Thus, the contact charging systems, which can provide more compact, low-cost, and low-environmental pollution electrophotographic apparatus, have become the mainstream particularly in medium- to small-sized apparatus.

In the case of an electrophotographic apparatus equipped with a contact charging system, local high electric fields are applied to defective areas of the photoconductor during contact charging, resulting in electrical pinholes, which may cause image quality defects.

As photoconductors that can prevent the image quality defects, electrophotographic photoconductors are known, which are provided with an undercoat layer that has a uniform thickness and can cover the unevenness of the surface of the conductive substrate.

As undercoat layers, anodic oxide films and boehmite films of aluminum, as well as resin films, such as polyvinyl alcohol, casein, polyvinylpyrrolidone, polyacrylate, gelatin, polyurethane, and polyamide are used.

These resin films can also contain particles of metal oxides such as titanium oxide and zinc oxide as fillers for the purpose of preventing the reflection of excess exposure light from the conductive substrate to prevent image defects caused by interference fringes, or for the purpose of appropriately controlling the resistance of the undercoat layer.

As an example of photoconductors provided with an undercoat layer containing zinc oxide particles as a filler, Patent Document 1 discloses a photoconductor containing metallic oxide particles surface-treated with an organometallic compound having a hydrolytic functional group in an undercoat layer.

Patent Document 2 discloses a photoconductor provided with an undercoat layer containing titanium oxide and zinc oxide particles hydrophobized with a reactive organosilicon compound. Patent Document 3 discloses an electrophotographic photoconductor provided with an undercoat layer containing zinc oxide particles that has been treated with a specific amount of an aminosilane compound and a urethane resin. Patent Document 4 discloses an electrophotographic photoconductor provided with an undercoat layer containing zinc oxide particles surface-treated with an organometallic compound or an aminosilane compound, and titanium oxide particles surface-treated with an organometallic compound or an aminosilane compound.

However, when the transfer voltage is high and the transfer history is enhanced with the recent increase in speed of equipment, or when the transfer voltage is set high to support cleanerless processes, electrophotographic photoconductors comprising an undercoat layer containing metallic oxide particles have a problem of accumulating space charge of reversed polarity in the photosensitive layer, which affects the chargeability during the next rotation process, resulting in image defects (transfer ghosting). Nevertheless, none of the Patent Documents 1 to 4 suggest a method to sufficiently reduce transfer ghosting under conditions with enhanced transfer history.

RELATED ART DOCUMENTS

Patent Documents

Patent Document 1: JP2004-020727A

Patent Document 2: JP2008-299020A

Patent Document 3: JP2013-137527A

Patent Document 4: JP2016-110127A

SUMMARY OF THE INVENTION

Problems to be Solved by the Invention

An object of the present invention is to provide an electrophotographic photoconductor that is less likely to cause transfer ghosting even when mounted in an electrophotographic apparatus with high transfer voltage set for high-speed or cleanerless processes, as well as a method of manufacturing the electrophotographic photoconductor, and an electrophotographic apparatus.

Means for Solving the Problems

The present inventors have intensively studied to find that the above problems can be solved by using zinc oxide particles surface-treated with an N-acylated amino acid or a salt thereof as a filler contained in an undercoat layer of a photoconductor, alone or in combination with other metallic oxide, thereby completing the present invention.

Accordingly, a first aspect of the present invention is an electrophotographic photoconductor including:

- a conductive substrate;
- an undercoat layer that is provided on the conductive substrate and comprises a resin binder and a first filler; and
- a photosensitive layer that is provided on the undercoat layer,
- wherein the first filler is zinc oxide particles that are surface-treated with an N-acylated amino acid or an N-acylated amino acid salt.

The undercoat layer preferably further includes a second filler, wherein the second filler being at least one type of metallic oxide particles that is different from the zinc oxide particles that are surface-treated. The metallic oxide particles can be composed of a metallic oxide selected from the group consisting of zinc oxide, titanium oxide, tin oxide, zirconium oxide, silicon oxide, copper oxide, magnesium oxide, antimony oxide, vanadium oxide, yttrium oxide, niobium oxide, and combinations thereof. The second filler preferably includes titanium oxide particles that are surface-treated with an aminosilane compound.

In addition, the first filler and the second filler preferably include 2% by mass or more of zinc oxide particles that are surface-treated with an N-acylated amino acid or an N-acylated amino acid salt.

In addition, the zinc oxide particles have an average primary particle diameter that ranges from preferably 1 nm to 350 nm.

In addition, the resin binder preferably includes a resin selected from the group consisting of acrylic resins, melamine resins, polyvinylphenol resins, and combinations of two or more thereof. In addition, a mass ratio of the first filler to the resin binder in the undercoat layer ranges from 50/50 to 90/10. In addition, the first filler and the second filler may have a combined mass and a mass ratio of the combined mass to the resin binder in the undercoat layer ranges from 50/50 to 90/10.

In addition, the photosensitive layer preferably includes a charge generation material, wherein the charge generation material is selected from the group consisting of titanyl phthalocyanine, metal-free phthalocyanine, and combinations thereof In addition, the photosensitive layer can be a multi-layer photosensitive layer including a charge generation layer and a charge transport layer, or a single-layer photosensitive layer having a single layer including a charge generation material and a charge transport material.

A second aspect of the present invention is a method of manufacturing the electrophotographic photoconductor, including

- preparing a coating solution for the undercoat layer comprising the zinc oxide particles that are surface-treated with an N-acylated amino acid or a salt thereof and
- applying the coating solution to the conductive substrate to form the undercoat layer thereon.

A third aspect of the present invention is an electrophotographic apparatus including the electrophotographic photoconductor.

Effects of the Invention

With the above configuration, the present invention can provide an electrophotographic photoconductor that is less likely to cause transfer ghosting even when mounted in an electrophotographic apparatus with high transfer voltage set for high-speed or cleanerless processes, as well as a method of manufacturing the electrophotographic photoconductor, and an electrophotographic apparatus.

MODE FOR CARRYING OUT THE INVENTION

Embodiments of the present invention will now be described in detail with reference to drawings. However, the present invention is not limited to the description below.

Figure 1A:
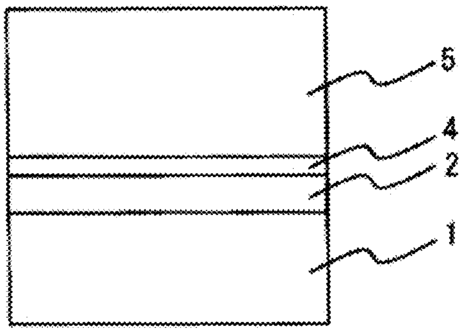
FIG. 1A is a schematic cross-sectional view showing a negatively-charged functionally-separated multi-layer electrophotographic photoconductor according to an exemplary configuration of the electrophotographic photoconductor of the present invention.
Figure 1B:
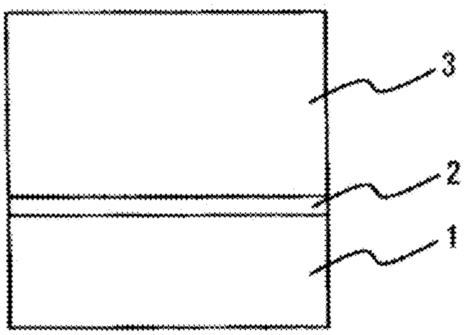
FIG. 1B is a schematic cross-sectional view showing a positively-charged single-layer electrophotographic photoconductor according to another exemplary configuration of the electrophotographic photoconductor of the present invention.
Figure 1C:
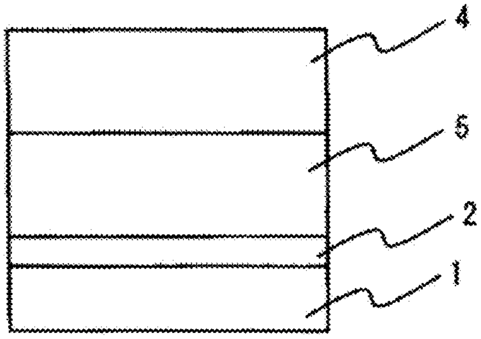
FIG. 1C is a schematic cross-sectional view showing a positively-charged functionally-separated multi-layer electrophotographic photoconductor according to still another exemplary configuration of the electrophotographic photoconductor of the present invention.

The electrophotographic photoconductor includes a conductive substrate, and an undercoat layer and a photosensitive layer provided on the conductive substrate in this order. Electrophotographic photoconductors are broadly classified into multi-layer (functionally separated) photoconductors, negatively-charged multi-layer photoconductor and positively-charged multi-layer photoconductor, and single-layer photoconductors mainly used in the positively-charged form. FIGS. 1A to 1C are schematic cross-sectional views showing an exemplary configuration of an electrophotographic photoconductor of the present invention, in which FIG. 1A shows a negatively-charged multi-layer electrophotographic photoconductor, FIG. 1B shows a positively-charged single-layer electrophotographic photoconductor, and FIG. 1C shows a positively-charged multi-layer electrophotographic photoconductor.

As shown in the Figure, the negatively-charged multi-layer photoconductor includes, on a conductive substrate 1, an undercoat layer 2 and a multi-layer photosensitive layer having a charge generation layer 4 with charge generation function and charge transport layer 5 with charge transport function, which are stacked in this order. The positively-charged single-layer photoconductor includes, on a conductive substrate 1, an undercoat layer 2 and a single-layer photosensitive layer 3 having a single layer with both charge generation and transport functions, which are stacked in this order. The positively-charged multi-layer photoconductor includes, on a conductive substrate 1, an undercoat layer 2 and a multi-layer photosensitive layer having a charge transport layer 5 with charge transport function and a charge generation layer 4 with both charge generation and transport functions, which are stacked in this order. The term "photosensitive layer" as used herein includes both a multi-layer photosensitive layer with a charge generation layer and a charge transport layer stacked, and a single-layer photosensitive layer. A protective layer (not shown) may also be included, as necessary, on the photosensitive layer in order to, for example, improve the printing durability.

Regardless of which type of photosensitive layer contained in the photoconductor in embodiments of the present invention, the undercoat layer 2 contains a resin binder and a first filler; and the first filler contains zinc oxide particles surface-treated with an N-acylated amino acid or an N-acylated amino acid salt.

With the above configuration, there can be provided an electrophotographic photoconductor that is less likely to cause transfer ghosting even when mounted in an electrophotographic apparatus with high transfer voltage set for high-speed or cleanerless processes. This is presumably because the hole transport capacity of the undercoat layer 2 is improved by using the undercoat layer 2, and the amount of trapping of holes derived from the undercoat layer 2 is reduced even when the transfer voltage is increased, thus making it possible to reduce the amount of decrease in the surface charged potential during the next process. In addition, the use of the undercoat layer 2 enhances the dispersion stability of the undercoat layer-coating solution and prevents the generation of secondary aggregates due to the dispersion of metal oxides in the undercoat layer 2, thereby realizing a photoconductor that does not produce black spots or background fogs on white paper as image defects originating from these secondary aggregates. Furthermore, the use of the undercoat layer can also maintain the stability of the potential retention rate of the surface of the photoconductor before and after repeated printing while sufficiently preventing the increase in surface residual potential.

Therefore, this electrophotographic photoconductor can be mounted in an electrophotographic apparatus to maintain the stability of the potential retention rate of the surface of the photoconductor before and after repeated printing while sufficiently preventing the increase in surface residual potential, without causing transfer ghosting even in apparatus with high transfer currents.

The undercoat layer may include a second filler in addition to the first filler, and the second filler may include at least one type of metallic oxide particles different from the zinc oxide particles surface-treated with an N-acylated amino acid or an N-acylated amino acid salt.

(Zinc Oxide Particles Surface-treated with N-acylated Amino Acid or Salt Thereof)

The N-acylated amino acid used in surface-treatment of the zinc oxide particles is composed of an amino acid moiety and a fatty acid moiety. Examples of the amino acid of the amino acid moiety include glycine, α-alanine, valine, leucine, isoleucine, serine, threonine, lysine, arginine, aspartic acid, glutamic acid, asparagine, glutamine, cysteine, cystine, methionine, phenylalanine, tyrosine, proline, hydroxyproline, tryptophan, histidine, β-alanine, 8-aminocaproic acid, sarcosine, and DL-pyroglutamic acid. The fatty acid of the fatty acid moiety may be either a saturated or unsaturated fatty acid, especially preferably a $C_{8-20}$ fatty acid, such as lauric acid, myristic acid, palmitic acid, stearic acid, oleic acid, or coconut oil fatty acid.

Examples of the N-acylated amino acid include lauroyl glutamic acid, myristoyl glutamic acid, coconut oil fatty acid glutamate (also called cocoyl glutamic acid), stearoyl glutamic acid, lauroyl aspartic acid, lauroyl sarcosine, myristoyl sarcosine, coconut oil fatty acid sarcosine, N-lauryl-N-methyl-β-alanine, cocoyl alanine, N-myristoyl-N-methyl-β-alanine, N-coconut oil fatty acid-N-methyl-β-alanine, and cocoyl glycine. Among these, cocoyl glutamic acid is preferable.

Preferred examples of the N-acylated amino acid salt include, but not limited to, metallic salts, ammonium salts, and organic amine salts. Examples of the metal atom constituting the metallic salt include monovalent metals such as sodium, lithium, potassium, rubidium, and cesium; divalent metals such as zinc, magnesium, calcium, strontium, and barium; trivalent metals such as aluminum; and other metals such as iron and titanium. Examples of the organic amine group constituting the organic amine salt include alkanolamine groups such as monoethanolamine groups, diethanolamine groups, and triethanolamine groups; alkylamine groups such as monoethylamine groups, diethylamine groups, and triethylamine groups; polyamine groups such as ethylenediamine groups, and triethylenediamine groups. Among these, more preferred salts are ammonium salts, sodium salts, and potassium salts, and still more preferred salts are sodium salts. Thus, the N-acylated amino acid salt is particularly preferably a sodium cocoyl glutamate salt.

Specific examples of the N-acylated amino acid or the salt thereof include AMINOSURFACT® ACDS-L (aqueous solution of sodium cocoyl glutamate salt), ACDP-L (aqueous solution of potassium cocoyl glutamate salt/sodium salt), ACMT-L (aqueous solution of triethanolamine cocoyl glutamate salt), ALMS-P1 (sodium lauroyl glutamate salt), AMMS-P1 (sodium myristoyl glutamate salt), AMINOFOAMER® FLDS-L (aqueous solution of sodium lauroyl aspartate salt), FCMT-L(aqueous solution of triethanolamine acyl aspartate salt), and FLMS-P1 (sodium lauroyl aspartate salt) produced from Asahi Kasei Finechem Co., Ltd.; and AMISOFT® HS-11P (sodium stearoyl glutamate salt), AMISOFT® HA-P (stearoyl glutamic acid), AMISOFT® MK-11 (potassium myristoyl glutamate salt), AMISOFT® CA (cocoyl glutamic acid), AMISOFT® CS-11 (sodium cocoyl glutamate salt), AMISOFT® CS-22 (aqueous solution of disodium cocoyl glutamate salt/sodium salt), and AMILITE® ACS-12 (aqueous solution of cocoyl alanine sodium salt) produced from Ajinomoto Co., Inc.

The surface treatment of zinc oxide particles with an N-acylated amino acid or a salt thereof is to attach an N-acylated amino acid or a salt thereof as a surface treatment agent to the surface of the zinc oxide particles by chemical or physical adsorption. For this, conventionally used surface treatment methods can be used as appropriate, without limitation. Specific examples of such methods include directly mixing an N-acylated amino acid or a salt thereof with particles (dry processing method, mechanochemical method), dispersing an N-acylated amino acid or a salt thereof in a dispersion medium and then mixing it with particles (semi-dry method), and dispersing particles in a dispersion medium to prepare a slurry and then mixing it with an N-acylated amino acid or a salt thereof (wet method).

The dry processing method is a method to make a surface treatment agent adsorb on and bind to the surface of particles by mechanochemical treatment that, for example, utilizes the impact force of a jet stream containing the surface treatment agent or utilizes the shear force by using a ball mill or the like mixed with a dispersion medium such as media to treat the surface of particles.

Examples of the dispersion medium used in the semi-dry and wet methods include, but are not limited to, water, organic solvents, and combinations thereof. Examples of the organic solvent include alcohols, acetone, dimethyl sulfoxide, dimethyl formamide, tetrahydrofuran, and dioxane. Examples of the alcohols include monovalent water-soluble alcohols, such as methanol, ethanol, and propanol; and water-soluble alcohols with two or more valencies, such as ethylene glycol and glycerol. The dispersion medium is preferably water, and more preferably ion exchanged water.

In the semi-dry and wet methods, particles and a surface treatment agent are dispersed in a solvent for surface treatment. Any known dispersion method may be employed without limitation. Dispersion can be carried out, for example, by agitation in a tank, or preferably by using a dispersing machine that can be used to disperse particles in a liquid, such as dispersion mixer, homomixer, in-line mixer, media grinder, three roll mill, attritor, colloid mill, or ultrasonic disperser.

In surface treatment, particles and a surface treatment agent are preferably sufficiently agitated to be in a uniformly mixed state. When a mixer is used in the dry and semi-dry methods, specific examples of the mixer include Powder Lab™ (capacity: 130 ml) and FM Mixer™ (capacity: 9 L) manufactured by Nippon Coke & Engineering. Co., Ltd., and when such a mixer is used, agitation is preferably performed with a higher rotation speed. Any agitation time that allows for uniform mixing and surface treatment can be selected, and it is preferably 10 minutes or more, and preferably 10 hours or less from the viewpoint of productivity. The rotation speed of the agitation is preferably 1,000 rpm or more, more preferably 2,000 rpm or more. A rotation speed of 500 rpm or less may result in insufficient surface treatment. The temperature during the surface treatment is not limited, and for example, it is preferably at 5 to 150° C., more preferably at 60 to 150° C., from a working point of view.

The amounts of the particles, surface treatment agent, solvent, and dispersion medium during each surface treatment are not particularly limited as long as they allow for implementation of desired surface treatment. Specifically, since loss of the surface treatment agent may occur during or after treatment, for example, 0.1 to 15 parts by mass of an N-acylated amino acid or a salt thereof is preferably used with respect to 100 parts by mass of zinc oxide particles. The amount of an N-acylated amino acid or a salt thereof with respect to 100 parts by mass of zinc oxide particles is preferably 0.2 to 12 parts by mass, more preferably 0.5 to 10 parts by mass.

The temperature during the treatment is not particularly limited as long as the desired surface treatment is carried out, and in the wet method, maturing of the slurry after slurry preparation is preferably performed at 60° C. or higher. The maturing temperature is more preferably 80° C. or higher, still more preferably 90° C. or higher. The upper limit of the maturing temperature is preferably 200° C. or lower in order to inhibit the degradation of amino acids. The upper limit of the maturing temperature is more preferably 150° C. or lower, still more preferably 130° C. or lower. The maturing of the slurry is preferably performed with stirring.

The maturing time is, without limitation, preferably 1 minute or more, more preferably 5 minutes or more, still more preferably 10 minutes or more. The upper limit of the maturing time is not particularly limited, and for example, is preferably 10 hours or less from the viewpoint of improving the manufacturing efficiency. The upper limit of the maturing time is more preferably 5 hours or less, still more preferably 2 hours or less.

In the wet method, the dispersion medium is preferably removed after the slurry maturation. For example, Neutralization, washing, and grinding, as well as other processes performed in usual particle surface treatment and the like, may be further carried out as necessary.

After the removal of the dispersion medium, drying is also preferably performed. Drying include vacuum drying and heat drying. In the case of heat drying, it is preferably performed at 35° C. to 200° C. for 5 minutes to 72 hours. Drying is expected to further improve the dispersibility of zinc oxide particles surface-treated with an N-acylated amino acid or a salt thereof.

The surface treatment with an N-acylated amino acid or a salt thereof is preferably performed such that the content of the surface treatment agent is 0.1 to 15% by mass when the zinc oxide particles after treatment are 100 parts by mass. When the content of the surface treatment agent is 0.1% by mass or more, it is possible to ensure good liquid stability and prevent aggregation and precipitation over time. When the content of the surface treatment agent is 15% by mass or less, it is possible to ensure good electrical characteristics of the photoconductor and prevent the occurrence of image defects. The content of the surface treatment agent is more preferably 0.2 to 9% by mass, still more preferably 0.5 to 8% by mass.

The average primary particle diameter of the zinc oxide particles is preferably within a range from 1 to 800 nm, more preferably 1 to 350 nm, still more preferably 10 to 300 nm.

Here, primary particles refer to individual particles that are not agglomerated, and the average primary particle diameter is obtained by measuring the diameters of a predetermined number of the particles and taking their average value. The average primary particle diameter of the zinc oxide particles is preferably 800 nm or less, which provides an undercoat layer-coating solution with better coating solution stability. The zinc oxide particles can be manufactured by a conventionally known method using various manufacturing processes. For example, zinc oxide particles manufactured by the French method or the American method may be used. The French method is a manufacturing method in which zinc metal is heated to form zinc vapor, oxidized, and then cooled. The American method is a manufacturing method in which a reducing agent is added to zinc ore, heated, reduced and volatilized, and the resulting metallic vapor is air oxidized. Alternatively, zinc oxide particles may be used, that are obtained by a wet method including roasting zinc hydroxide or basic zinc carbonate obtained through precipitation by the reaction of soluble zincs (such as zinc chloride, and zinc sulfate) with an alkaline solution (such as aqueous sodium hydroxide solution). Specifically, for example, FINEX-25, FINEX-30, FINEX-50, XZ-100F-LP, and XZ-300F-LP manufactured by Sakai Chemical Industry Co., Ltd., MZ-300 and MZ-500 manufactured by TAYCA Co., Ltd., and FZO-50 manufactured by Ishihara Sangyo Kaisha, Ltd. can be used.

(Metallic Oxide Particle)

Preferred examples of metallic oxide particles different from zinc oxide particles surface-treated with an N-acylated amino acid or a salt thereof, which may be further mixed into the undercoat layer 2 as a second filler, include particles composed of one or more metallic oxide selected from the group consisting of zinc oxide, titanium oxide, tin oxide, zirconium oxide, silicon oxide, copper oxide, magnesium oxide, antimony oxide, vanadium oxide, yttrium oxide, and niobium oxide. Of these, titanium oxide particles are preferred, especially those surface-treated with a silane coupling agent. The average primary particle diameter of titanium oxide particles is preferably 10 nm to 500 nm, more preferably 20 nm to 300 nm.

Preferred examples of the silane coupling agent include aminosilane compounds, for example, aminosilane compounds, such as N-β(aminoethyl)y-aminopropyltrimethoxysilane, γ-aminopropyltriethoxysilane, N-phenyl-β-aminopropyltrimethoxysilane, N-2-(aminoethyl)-3-aminopropylmethyldimethoxysilane, N-2-(aminoethyl)-3-aminopropylmethyltrimethoxysilane, 3-aminopropyltrimethoxysilane, 3-aminopropylmethyltrimethoxysilane, 3-aminopropylmethyltriethoxysilane, 3-triethoxysilyl-N-(1,3-dimethyl-butylidene)propylamine, aminopropylmethyltrimethoxysilane, and N-phenyl-3-aminopropyltrimethoxysilane. Specifically, silane coupling agents manufactured by Shin-Etsu Chemical Co., Ltd., such as KBM-603 (N-β(aminoethyl)γ-aminopropyltrimethoxysilane), KBE-903 (γ-aminopropyltriethoxysilane), KBM-573 (N-phenyl-γ-aminopropyltrimethoxysilane), KBM-602 (N-2-(aminoethyl)-3-aminopropylmethyldimethoxysilane), KBM-903 (3-aminopropyltrimethoxysilane), and KBE-9103P (3-triethoxysilyl-N-(1,3-dimethyl -butylidene)propylamine) can be used.

Especially, titanium oxide particles surface-treated with an aminosilane compound are preferably used as the metallic oxide particles, allowing for more effective reduction of transfer ghosting.

The surface treatment method of titanium oxide particles with a silane coupling agent preferably includes mechanochemically surface-treating and binding titanium oxide particles with a silane coupling agent by a gas-phase method. Specifically, titanium oxide particles and a silane coupling agent are mixed using a blender such as ball mill or Henschel mixer, and then grinded using a jet air grinder such as jet mill while being subjected to surface treatment. The obtained titanium oxide surface-treated with the silane coupling agent can be used directly, or may be used after washing with pure water. The crystal type of titanium dioxide may be anatase, rutile, brookite, or a mixed crystal thereof.

Preferably, the undercoat layer 2 includes at least a first filler, and the first filler includes zinc oxide particles surface-treated with an N-acylated amino acid or a salt thereof. When the undercoat layer 2 further includes a second filler in addition to the zinc oxide particles surface-treated with an N-acylated amino acid or a salt thereof, and the second filler is combined with at least one metallic oxide particles different from the zinc oxide particles surface-treated with an N-acylated amino acid or a salt thereof, then the amount of the zinc oxide particles surface-treated with an N-acylated amino acid or a salt thereof contained in the first filler and the second filler is preferably 2% by mass or more. From the viewpoint of prevention of transfer ghosting, the amount of the zinc oxide particles surface-treated with an N-acylated amino acid or a salt thereof with respect to the total amount of the fillers is preferably 20% by mass or more, more preferably 40% by mass or more. When the undercoat layer 2 does not contain zinc oxide particles surface-treated with N-acylated amino acid or a salt thereof as a filler, no improvement effect on transfer ghosting is obtained.

In embodiments of the present invention, when the undercoat layer 2 in the photoconductor satisfies the conditions for fillers, other components are not particularly restricted and can be selected as appropriate according to conventional methods. Components of layers of the photoconductor are described below.

(Conductive Substrate)

The conductive substrate 1 can be a cylindrical body made of various metals, for example, an aluminum alloy, such as JIS 3003 series, JIS 5000 series, or JIS 6000 series, or a conductive plastic film. The conductive substrate 1 can also be a molded body or sheet material made of glass, acryl, polyamide, or polyethylene terephthalate, to which electrodes are added. The conductive substrate 1 is finished into a substrate of a predetermined dimensional accuracy by extrusion or drawing process in the case of aluminum alloy, or by injection molding in the case of resin. The surface of the conductive substrate 1 is processed, as necessary, to have an appropriate surface roughness by, for example, cutting with a diamond tool, and then degreased and cleaned using a water-based detergent such as a weak alkaline detergent.

(Undercoat Layer)

The undercoat layer 2 includes a filler and a resin binder, and the filler is required to satisfy the conditions as described above.

Examples of the resin binder used in the undercoat layer 2 include resins such as polyethylene, polypropylene, polystyrene, acrylic resins, polyvinyl chloride resins, vinyl acetate resins, polyurethane, epoxy resins, polyester, melamine resins, silicone resins, polyvinyl butyral, polyamide, casein, gelatin, polyvinyl alcohol, phenolic resins, polyvinylphenol resins, and ethyl cellulose, which can be used alone or in combination of two or more thereof. Especially, the resin binder contained in the undercoat layer 2 preferably includes two or more selected from the group consisting of acrylic resins, melamine resins, and polyvinylphenol resins.

The mass ratio [filler/resin binder, hereinafter also referred to as F/B] of the filler including the first filler or the filler including the first filler and the second filler to the resin binder in the undercoat layer 2 is preferably 50/50 to 90/10. The ratio of the filler (F/B) in the undercoat layer 2 can be set to 50/50 or higher with the ratio of the resin binder kept low to prevent low density image defects caused by insufficient decrease in the potential of the exposed area due to an excessively high volume resistance of the undercoat layer 2 under low temperature and low humidity conditions. The ratio of the filler can be set to 90/10 or lower to improve the stability of the undercoat layer-coating solution and prevent aggregation and precipitation over time.

The undercoat layer 2 mainly includes a filler and a resin, and may further contain a known additive. Examples of such an additive can include metal powder such as aluminum, conductive substances such as carbon black, electron transport substances such as electron transport pigments, known materials such as polycyclic fused compounds, metal chelate compounds, and organometallic compounds. Preferred examples of the electron transport substances include benzophenone compounds having a hydroxy group, and anthraquinone compounds having a hydroxy group.

The undercoat layer-coating solution used to form the undercoat layer 2 is prepared by dispersing and adding the filler to a resin solution with a resin binder dissolved in a solvent. The solvent is preferably selected, as appropriate, in consideration of, for example, the dispersibility of the filler, solubility to the resin binder, preservability, volatility, and safety. Specific examples of the solvent include alcohols such as methanol, ethanol, n-propyl alcohol, isopropyl alcohol, n-butanol, t-butanol, sec-butanol, and benzyl alcohol, toluene, cyclohexanone, tetrahydrofuran, and methylene chloride. The filler can be dispersed using general-purpose equipment such as a vibration mill, paint shaker, or sand grinder. Zirconia is preferably used as the dispersion medium as it allows for more uniform dispersion.

The thickness of the undercoat layer 2 is preferably within a range from 0.1 to 10 μm, more preferably 0.3 to 5 μm, still more preferably 0.5 to 3 μm. When the thickness of the undercoat layer 2 is 0.1 μm or more, the injection of electric charge can be properly prevented and the occurrence of black spot defects on the image can be prevented. When the thickness of the undercoat layer 2 is 10 μm or less, the increase in resistance can be reduced and the occurrence of image defects due to low density can be prevented.

The undercoat layer 2 may be used as a single layer or a laminate of two or more different layers. In the case of a laminate, all of the layers do not necessarily contain zinc oxide particles surface-treated with an N-acylated amino acid or a salt thereof. For example, an undercoat layer 2 composed solely of a thermoplastic resin such as alcohol-soluble nylon may be stacked on an undercoat layer 2 containing zinc oxide particles surface-treated with an N-acylated amino acid or a salt thereof. Alternatively, an undercoat layer 2 containing zinc oxide particles surface-treated with an N-acylated amino acid or a salt thereof may be stacked on an undercoat layer 2 composed of an anodic oxide film of aluminum.

(Negatively-Charged Multi-Layer Photoconductor)

As described above, the photosensitive layer in the negatively-charged multi-layer photoconductor includes, on an undercoat layer 2, a charge generation layer 4 and a charge transport layer 5, which are stacked in this order.

The charge generation layer 4 can be formed using various organic pigments as charge generation materials with a resin binder. Particularly preferred charge generation materials are, for example, metal-free phthalocyanines having various crystal forms, various phthalocyanines having a central metal such as copper, aluminum, indium, vanadium, or titanium, various bisazo pigments, and trisazo pigments. Especially preferred charge generation materials are titanyl phthalocyanine and metal-free phthalocyanines, which can be used alone or in combination of two or more thereof. These organic pigments are used with the particle diameter adjusted to 50 to 800 nm, preferably 150 to 500 nm, in a state dispersed in the resin binder.

The performance of the charge generation layer 4 is also affected by the resin binder. Any appropriate resin binder can be selected from, for example, various polyvinyl chloride, polyvinyl butyral, polyvinyl acetal, polyester, polycarbonate, acrylic resins, and phenoxy resins. The thickness of the charge generation layer 4 can be 0.1 to 5 μm, and particularly preferably 0.2 to 0.5 μm.

The choice of the solvent used in the charge generation layer-coating solution is also important for good dispersion and formation of a uniform charge generation layer 4. Examples of the solvent include aliphatic halogenated hydrocarbons such as methylene chloride, and 1,2-dichloroethane, ether-based hydrocarbons such as tetrahydrofuran, ketones such as acetone, methyl ethyl ketone, and cyclohexanone, and esters such as ethyl acetate, and ethyl cellosolve. The ratio of the charge generation material and the resin binder in the coating solution is desirably adjusted such that the ratio of the resin binder is 20 to 80 parts by mass in the charge generation layer 4 after application and dryness. Especially preferred composition of the charge generation layer 4 is 60 to 40 parts by mass of the charge generation material relative to 40 to 60 parts by mass of the resin binder.

In application and formation of the charge generation layer 4, the above-described materials are mixed as appropriate to prepare a charge generation layer-coating solution, which is then processed using dispersing equipment such as sand mill or paint shaker to adjust the particle diameter of the organic pigment particles to the desired size for coating.

The charge transport layer 5 can be formed by dissolving a charge transport material alone or in combination with a resin binder in an appropriate solvent to prepare a charge transport layer-coating solution, applying it on the charge generation layer 4 using, for example, a dipping or applicator method, and drying it. The charge transport material can be appropriately selected from known substances with hole transport properties (for example, those illustrated in "Borsenberger, P. M. and Weiss, D. S., "Organic Photoreceptors for Imaging Systems," Marcel Dekker Inc., 1993". Specific examples of such a hole transport material can include various hydrazone, styryl, diamine, butadiene, enamine, indole compounds, and combinations thereof.

Polycarbonate polymers are widely used as the resin binder that form the charge transport layer 5 together with a charge transport material, from the viewpoint of film strength and abrasion resistance. Such polycarbonate polymers include bisphenols A, C, and Z, and copolymers including the monomer unit constituting the bisphenols may be used. The optimum molecular weight of such a polycarbonate polymer ranges from 10,000 to 100,000. Other polymers such as polyethylene, polyphenylene ether, acryl, polyester, polyamide, polyurethane, epoxy, polyvinyl acetal, polyvinyl butyral, phenoxy resins, silicone resins, polyvinyl chloride, polyvinylidene chloride, polyvinyl acetate, cellulose resins, and copolymers thereof can also be used.

The charge transport layer 5 is preferably formed to have a thickness ranging from 3 to 50 μm, considering the charging characteristics and abrasion resistance of the photoconductor. A silicone oil may also be added as appropriate to the charge transport layer 5 to obtain surface smoothness.

(Positively-Charged Single-Layer Photoconductor)

As described above, the photosensitive layer 3 in the positively-charged single-layer photoconductor includes a single layer containing a charge generation material and a charge transport material, formed on an undercoat layer 2.

The single-layer photosensitive layer 3 mainly contains a charge generation material, a hole transport material, an electron transport material (acceptor compound), and a resin binder. As the charge generation material, the same type of various organic pigments as those in the case of the multi-layer photosensitive layer can be used. Particularly preferred charge generation materials are, for example, metal-free phthalocyanines having various crystal forms, various phthalocyanines having a central metal such as copper, aluminum, indium, vanadium, or titanium, and various bisazo and trisazo pigments. Especially preferred charge generation materials are titanyl phthalocyanine and metal-free phthalocyanines, which can be used alone or in combination of two or more thereof Examples of the hole transport material can include various hydrazone, styryl, diamine, butadiene, indole compounds, and combinations thereof, while examples of the electron transport material can include various benzoquinone derivatives, phenanthrene quinone derivatives, stilbenequinone derivatives, and azoquinone derivatives, both of which can be used alone or in combination of two or more thereof.

As the resin binder, a polycarbonate resin can be used alone, or in combination with a resin such as a polyester resin, a polyvinyl acetal resin, a polyvinyl butyral resin, a polyvinyl alcohol resin, a polyvinyl chloride resin, a vinyl acetate resin, polyethylene, polypropylene, polystyrene, an acrylic resin, a polyurethane resin, an epoxy resin, a melamine resin, a silicon resin, a silicone resin, a polyamide resin, a polystyrene resin, a polyacetal resin, a polyalylate resin, a polysulfone resin, a methacrylate polymer, or a copolymer thereof, as appropriate. The same type of resins having different molecular weights may also be used in combination.

The thickness of the single-layer photosensitive layer 3 is preferably 3 to 100 μm, more preferably 10 to 50 μm, in order to maintain a practically effective surface potential. A silicone oil may also be added as appropriate to the single-layer photosensitive layer 3 to obtain surface smoothness.

(Positively-Charged Multi-Layer Photoconductor)

As described above, the photosensitive layer in the positively-charged multi-layer photoconductor includes, on an undercoat layer 2, a charge transport layer 5 and a charge generation layer 4, which are stacked in this order.

The charge transport layer 5 in the positively-charged multi-layer photoconductor mainly includes a hole transport material and a resin binder. As the hole transport material and the resin binder in the charge transport layer 5, the same materials as those listed for the single-layer photosensitive layer 3 can be used.

The content of the hole transport material in the charge transport layer 5 is preferably 10 to 80% by mass, more preferably 20 to 70% by mass, relative to the solid content of the charge transport layer 5. The content of the resin binder in the charge transport layer 5 is preferably 20 to 90% by mass, more preferably 30 to 80% by mass, relative to the solid content of the charge transport layer 5.

The thickness of the charge transport layer 5 is preferably within the range from 3 to 50 μm, more preferably within the range from 15 to 40 μm, in order to maintain a practically effective surface potential.

The charge generation layer 4 in the positively-charged multi-layer photoconductor mainly includes a charge generation material, a hole transport material, an electron transport material, and a resin binder. As the charge generation material, the hole transport material, the electron transport material, and the resin binder in the charge generation layer 4, the same materials as those listed for the single-layer photosensitive layer 3 can be used.

The content of the charge generation material in the charge generation layer 4 is preferably 0.1 to 5% by mass, more preferably 0.5 to 3% by mass, relative to the solid content of the charge generation layer 4. The content of the hole transport material in the charge generation layer 4 is preferably 1 to 30% by mass, more preferably 5 to 20% by mass, relative to the solid content of the charge generation layer 4. The content of the electron transport material in the charge generation layer 4 is preferably 5 to 60% by mass, more preferably 10 to 40% by mass, relative to the solid content of the charge generation layer 4. The content of the resin binder in the charge generation layer 4 is preferably 20 to 80% by mass, more preferably 30 to 70% by mass, relative to the solid content of the charge generation layer 4.

The thickness of the charge generation layer 4 can be the same as that of the single-layer photosensitive layer 3 of the single-layer photoconductor.

In embodiments of the present invention, the photosensitive layer of the photoconductor, whether of the multi-layer type or the single-layer type, can contain a leveling agent, such as a silicone oil or a fluorine-based oil, for the purpose of improving the leveling properties of or imparting lubricity to the film to be formed. Two or more inorganic oxides can also be contained for the purpose of, for example, adjusting the film hardness, reducing the coefficient of friction, and imparting lubricity. The photosensitive layer may contain microparticles composed of metallic oxide, such as silica, titanium oxide, zinc oxide, calcium oxide, alumina, or zirconium oxide; of metal sulfate, such as barium sulfate, or calcium sulfate; or of metal nitride, such as silicon nitride, or aluminum nitride; or fluorine-based resin particles, such as a tetrafluoroethylene resin; or fluorine-based comb-like graft polymerized resin particles. The photosensitive layer can further contain, as necessary, other well-known additives without significantly impairing the electrophotographic characteristics.

The photosensitive layer can also contain an antidegradant such as an antioxidant or a light stabilizer for the purpose of improving the environmental resistance and the stability against harmful light. Examples of the compound used for such a purpose include chromanol derivatives such as tocopherol, and esterified compounds, polyarylalkane compounds, hydroquinone derivatives, etherified compounds, dietherified compounds, benzophenone derivatives, benzotriazole derivatives, thioether compounds, phenylenediamine derivatives, phosphonates, phosphites, phenol compounds, hindered phenol compounds, linear amine compounds, cyclic amine compounds, and hindered amine compounds.

In embodiments of the present invention, the electrophotographic photoconductor can be applied to various machine processes to provide desired effects. Specifically, sufficient effects can be obtained in charging processes such as contact charging systems using charging members such as rollers and brushes and non-contact charging systems using charging members such as corotron and scorotrons, as well as in developing processes such as contact developing and non-contact developing systems using developers such as non-magnetic one-component, magnetic one-component, or two-component developers.

(Method of Manufacturing Electrophotographic Photoconductor)

In embodiments of the present invention, the method of manufacturing an electrophotographic photoconductor includes preparing an undercoat layer-coating solution including zinc oxide particles surface-treated with an N-acylated amino acid or a salt thereof; and forming an undercoat layer 2 on a conductive substrate 1 using the undercoat layer-coating solution, in order to manufacture the electrophotographic photoconductor described above.

The undercoat layer 2 can be formed by applying the undercoat layer-coating solution prepared as described above to the surface of a conductive substrate 1, and drying it, according to a conventional method. Known methods such as dip coating, doctor blade, bar coater, roll transfer, and spray methods can be used to apply the coating solution, and a dip coating method is preferably used in application to a cylindrical conductive substrate. The method of drying the coating film formed by the undercoat layer-coating solution can be selected as appropriate according to the type of the solvent and the thickness of the film to be formed, and thermal drying is particularly preferred. The drying conditions can be, for example, at 50 to 200° C. for 1 to 120 min.

Specifically, in the case of a negatively-charged multi-layer photoconductor, first, an undercoat layer-coating solution including the above specific filler prepared as described above is applied to the surface of a conductive substrate 1 and dried according to a conventional method to form an undercoat layer 2. Next, a charge generation layer 4 is formed by a method including: dissolving and dispersing a desired charge generation material and resin binder in a solvent to prepare a charge generation layer-coating solution; and applying the charge generation layer-coating solution to the surface of the undercoat layer 2 and drying it to form the charge generation layer 4. Then, a charge transport layer 5 is formed by a method including: dissolving a desired hole transport material and resin binder in a solvent to prepare a charge transport layer-coating solution; and applying the charge transport layer-coating solution to the surface of the charge generation layer 4 and drying it to from the charge transport layer. The negatively-charged multi-layer photoconductor according to embodiments of the present invention can be manufactured by such manufacturing methods.

In the case of a positively-charged single-layer photoconductor, it can be manufactured by a method including: applying an undercoat layer-coating solution including the above specific filler prepared as described above to the surface of a conductive substrate 1 and drying it according to a conventional method to form an undercoat layer 2; dissolving and dispersing a desired charge generation material, hole transport material, electron transport material, and resin binder in a solvent to prepare a single-layer photosensitive layer-coating solution; and applying the obtained single-layer photosensitive layer-coating solution to the surface of the undercoat layer 2 and drying it to from a single-layer photosensitive layer 3.

In the case of a positively-charged multi-layer photoconductor, first, an undercoat layer-coating solution including the above specific filler prepared as described above is applied to the surface of a conductive substrate 1 and dried according to a conventional method to form an undercoat layer 2. Then, a charge transport layer 5 is formed by a method including: dissolving a desired hole transport material and resin binder in a solvent to prepare a charge transport layer-coating solution; and applying the charge transport layer-coating solution to the surface of the undercoat layer 2 and drying it to from the charge transport layer. Next, a charge generation layer 4 is formed by a method including: dissolving and dispersing a desired charge generation material, hole transport material, electron transport material, and resin binder in a solvent to prepare a charge generation layer-coating solution; and applying the charge generation layer-coating solution to the surface of the charge transport layer 5 and drying it to form the charge generation layer 4. The positively-charged multi-layer photoconductor according to embodiments of the present invention can be manufactured by such manufacturing methods.

(Electrophotographic Apparatus)

In embodiments of the present invention, the electrophotographic apparatus includes the electrophotographic photoconductor as described above. This allows for providing an electrophotographic apparatus that is less likely to cause transfer ghosting even with the transfer voltage set high for high-speed or cleanerless processes.

Figure 2:
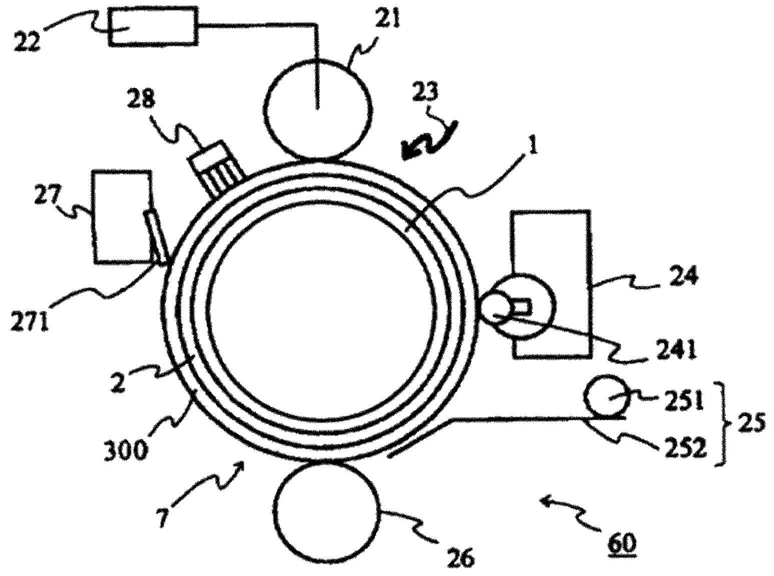
FIG. 2 is a schematic diagram showing an exemplary configuration of the electrophotographic apparatus of the present invention.

FIG. 2 is a schematic showing an exemplary configuration of the electrophotographic apparatus of the present invention. As shown, the electrophotographic apparatus 60 is equipped with the photoconductor 7 in one embodiment of the present invention, wherein the photoconductor 7 includes a conductive substrate 1, and an undercoat layer 2 and a photosensitive layer 300 coated on the outer peripheral surface of the conductive substrate 1. The electrophotographic apparatus 60 includes a charging member 21 arranged on the outer circumference of the photoconductor 7, a high-voltage power supply 22 for supplying an applied voltage to the charging member 21, an image exposure member 23, a development device 24, a paper feed 25, and a transfer charging device 26. The charging member 21 may be in the form of a roller. The development device 24 may include a developer roller 241. The paper feed 25 may include a paper feed roller 251 and a paper feed guide 252. The transfer charging device 26 may be direct charging type. The electrophotographic apparatus 60 may further include a cleaner 27 including a cleaning blade 271, and a discharging member 28. The electrophotographic apparatus 60 can be a color printer. The image formation process performed in the electrophotographic apparatus 60 may be a reversal development process including attaching toner to an area with the surface potential reduced by exposure (latent image), and developing the latent image. The negatively-charged photoconductor 7 may be negatively charged by the charging member 21, developed with negatively-charged toner in the development device 24, and positively charged by the transfer charging device 26. The positively-charged photoconductor 7 may be positively charged by the charging member 21, developed with positively-charged toner in the development device 24, and negatively charged by the transfer charging device 26.

EXAMPLES

The present invention will now be described in more detail with reference to Examples, but is not limited to them.

<Production Method of Surface-treated Zinc Oxide Particles>

(Production Example 1: Zinc Oxide Particles (20 nm) Surface-treated with Amino Acid Salt A)

To a mixer (Nippon Coke & Engineering. Co., Ltd., Powder Lab™, tank capacity: 130 ml), 100 g of zinc oxide particles without surface treatment (Sakai Chemical Industry Co., Ltd., FINEX-50, average primary particle diameter: 20 nm) were put, and 50 g of an aqueous solution containing 6 g of sodium cocoyl glutamate (Ajinomoto Co., Inc., AMISOFT® CS-11) (hereinafter referred to as "amino acid salt A") dissolved as a surface treatment agent were added and mixed at 2000 rpm for 10 min. Then, the rotation speed was changed to a predetermined speed of 2,500 rpm, the temperature in the tank was raised to a predetermined temperature of 100° C. with stirring, and a vacuum pump was used to generate negative pressure to remove water and other volatiles, thereby obtaining a powder of zinc oxide particles (20 nm) surface-treated with amino acid salt A.

(Production Example 2: Zinc Oxide Particles (20 nm) Surface-treated with Amino Acid Salt A)

A powder of zinc oxide particles (20 nm) surface-treated with amino acid salt A was obtained in the same manner as in Production Example 1 except that the amount of the surface treatment agent in Production Example 1 was changed to 0.5 g.

(Production Example 3: Zinc Oxide Particles (20 nm) Surface-treated with Amino Acid Salt A)

A powder of zinc oxide particles (20 nm) surface-treated with amino acid salt A was obtained in the same manner as in Production Example 1 except that the amount of the surface treatment agent in Production Example 1 was changed to 10 g.

(Production Example 4: Zinc Oxide Particles (35 nm) Surface-treated with Amino Acid Salt A)

A powder of zinc oxide particles (35 nm) surface-treated with amino acid salt A was obtained in the same manner as in Production Example 1 except that the zinc oxide particles without surface treatment (Sakai Chemical Industry Co., Ltd., FINEX-50, average primary particle diameter: 20 nm) was changed to zinc oxide particles without surface treatment (Sakai Chemical Industry Co., Ltd., FINEX-30, average primary particle diameter: 35 nm).

(Production Example 5: Zinc Oxide Particles (20 nm) Surface-treated with Amino Acid Salt B)

A powder of zinc oxide particles (20 nm) surface-treated with amino acid salt B was obtained in the same manner as in Production Example 1 except that the surface treatment agent was changed to sodium lauroyl glutamate (Asahi Kasei Finechem Co., Ltd., AMINOFOAMER® ALMS-P1) (hereinafter referred to as "amino acid salt B").

(Production Example 6: Zinc Oxide Particles (20 nm) Surface-treated with Amino Acid C)

A powder of zinc oxide particles (20 nm) surface-treated with amino acid C was obtained in the same manner as in Production Example 1 except that the surface treatment agent was changed to stearoyl glutamic acid (Ajinomoto Co., Inc., AMISOFT® HA-P) (hereinafter referred to as "amino acid C").

(Production Example 7: Zinc Oxide Particles (20 nm) Surface-treated with Amino Acid Salt D)

A powder of zinc oxide particles (20 nm) surface-treated with amino acid D was obtained in the same manner as in Production Example 1 except that the surface treatment agent was changed to potassium myristoyl glutamate salt (Ajinomoto Co., Inc., AMISOFT® MK-11) (hereinafter referred to as "amino acid salt D").

(Production Example 8: Zinc Oxide Particles (20 nm) Surface-treated with Vinylsilane)

A powder of zinc oxide particles (20 nm) surface-treated with vinylsilane was obtained in the same manner as in Production Example 1 except that the surface treatment agent was changed to vinyltriethoxysilane (Shin-Etsu Chemical Co., Ltd., KBE-1003) (hereinafter referred to as "vinylsilane").

(Production Example 9: Zinc Oxide Particles (20 nm) Surface-treated with Acrylic Silane)

A powder of zinc oxide particles (20 nm) surface-treated with acrylic silane was obtained in the same manner as in Production Example 1 except that the surface treatment agent was changed to 3-acryloxypropyltrimethoxysilane (Shin-Etsu Chemical Co., Ltd., KBM-5103) (hereinafter referred to as "acrylic silane").

(Production Example 10: Zinc Oxide Particles (350 nm) Surface-treated with Amino Acid Salt A)

A powder of zinc oxide particles (350 nm) surface-treated with amino acid salt A was obtained in the same manner as in Production Example 1 except that the zinc oxide particles without surface treatment (Sakai Chemical Industry Co., Ltd., FINEX-50, average primary particle diameter: 20 nm) was change to zinc oxide particles without surface treatment (Hakusui Tech Co., Ltd., ultrafine zinc oxide particles for heat dissipation, average primary particle: diameter 350 nm).

(Production Example 11: Titanium Oxide Particles (21 nm) Surface-treated with Aminosilane)

Five parts by mass of γ-aminopropyltriethoxysilane (Shin-Etsu Chemical Co., Ltd., KBE-903) (hereinafter referred to as "aminosilane") as a surface treatment agent was bound to the surface of 100 parts by mass of titanium oxide particles without surface treatment (Nippon Aerosil Co., Ltd., P25, average primary particle diameter: 21 nm) via mechanochemical surface treatment using a gas-phase method. The resulting product was washed with pure water and dried sufficiently to obtain a powder of titanium oxide particles (21 nm) surface-treated with aminosilane.

(Production of Negatively-Charged Multi-Layer Photoconductor)

Example 1

First, 48.0 parts by mass of polyvinylphenol resin (product name MARUKA LYNCUR MH-2, Maruzen Petrochemical Co., Ltd.) and 42.0 parts by mass of melamine resin (product name U-VAN™ 2021, Mitsui Chemicals, Inc., solid content ratio: 75%) as resin binders for undercoat layer, and 239.0 parts by mass of the zinc oxide particles (20 nm) surface-treated with amino acid salt A obtained in Production Example 1 as a filler for undercoat layer were added to a mixed solvent of 1500.0 parts by mass of methanol and 300.0 parts by mass of butanol as a solvent to obtain a slurry. The mass ratio of filler to resin binder (F/B) in the slurry was 75/25. Then, 5 L of the obtained slurry was processed for 20 passes using a disc type bead mill filled with zirconia beads with a bead diameter of 0.3 mm at a bulk filling rate of 80 v/v % with respect to the vessel capacity at a processing liquid flow rate of 300 ml and a disc peripheral speed of 4 m/s to obtain an undercoat layer-coating solution.

The prepared undercoat layer-coating solution was used to form an undercoat layer 2 on a cylindrical aluminum substrate 1 as a conductive substrate by dip coating. The undercoat layer 2 was dried at 135° C. for 20 min, which had a thickness of 1.5 μm after dryness.

Next, 1 part by mass of polyvinyl butyral resin (S-LEC BM-1, Sekisui Chemical Co., Ltd.) as a resin binder for charge generation layer was dissolved in 98 parts by mass of dichloromethane. To the solution, 2 parts by mass of a-titanyl phthalocyanine as a charge generation material as described in US8053570B2 was added to prepare a slurry. Then, 5 L of the prepared slurry was processed for 10 passes using a disc type bead mill filled with zirconia beads with a bead diameter of 0.4 mm at a bulk filling rate of 85 v/v% with respect to the vessel capacity at a processing liquid flow rate of 300 mL and a disc peripheral speed of 3 m/s to obtain a charge generation layer-coating solution.

The obtained charge generation layer-coating solution was used to form a charge generation layer 4 by dip coating on the conductive substrate 1 coated with the undercoat layer 2. The charge generation layer 4 was dried at 80° C. for 30 min, which had a thickness of 0.3 μm after dryness.

Next, 5 parts by mass of a compound represented by the structural formula (3) below and 5 parts by mass of a compound represented by the structural formula (4) below as charge transport materials (CTMs) for charge transport layer, and 10 parts by mass of polycarbonate resin (IUPIZETA™ PCZ-500, from Mitsubishi Gas Chemical Company) as a resin binder for charge transport layer were dissolved in 80 parts by mass of dichloromethane. After the dissolution, 0.1 parts by mass of silicone oil (KP-340, from Shin-Etsu Polymer Co., Ltd.) was added to the solution to prepare a charge transport layer-coating solution. The prepared charge transport layer-coating solution was used to form a charge transport layer 5 on the charge generation layer 4 by dip coating. The charge transport layer 5 was dried at 90° C. for 60 min, which had a thickness of 25 μm after dryness. As a result, an electrophotographic photoconductor was prepared.

structural formula (3)

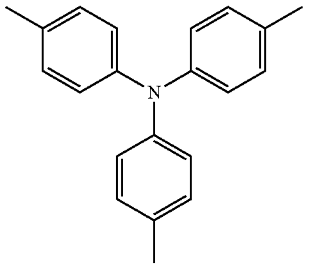

structural formula (4)

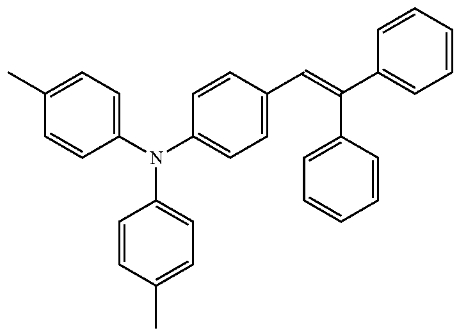

Example 2

An electrophotographic photoconductor was prepared in the same manner as in Example 1 except that the amount of the solvent in the undercoat layer-coating solution used in Example 1 was adjusted, and that the thicknesses of the dried undercoat layer was changed to 0.1 μm.

Example 3

An electrophotographic photoconductor was prepared in the same manner as in Example 1 except that the amount of the solvent in the undercoat layer-coating solution used in Example 1 was adjusted, and that the thicknesses of the dried undercoat layer was changed to 10.0 μm.

Example 4

First, 118.1 parts by mass of polyvinylphenol resin (product name MARUKA LYNCUR MH-2, Maruzen Petrochemical Co., Ltd.) and 104.9 parts by mass of melamine resin (product name U-VAN™ 2021, Mitsui Chemicals, Inc., solid content ratio: 75%) as resin binders, and 106.0 parts by mass of the zinc oxide particles (20 nm) surface-treated with amino acid salt A obtained in Production Example 1 as a filler for undercoat layer were added to a mixed solvent of 1500.0 parts by mass of methanol and 300.0 parts by mass of butanol to obtain a slurry. The mass ratio of filler to resin binder (F/B) in the slurry was 35/65. This slurry was used as in Example 1 to prepare an undercoat layer-coating solution, and an electrophotographic photoconductor was prepared in the same manner as in Example 1.

Example 5

First, 19.7 parts by mass of polyvinylphenol resin (product name MARUKA LYNCUR MH-2, Maruzen Petrochemical Co., Ltd.) and 17.5 parts by mass of melamine resin (product name U-VAN™ 2021, Mitsui Chemicals, Inc., solid content ratio: 75%) as resin binders, and 296.1 parts by mass of the zinc oxide particles (20 nm) surface-treated with amino acid salt A obtained in Production Example 1 as a filler for undercoat layer were added to a mixed solvent of 1500.0 parts by mass of methanol and 300.0 parts by mass of butanol to obtain a slurry. The mass ratio of filler to resin binder (F/B) in the slurry was 90/10. This slurry was used as in Example 1 to prepare an undercoat layer-coating solution, and an electrophotographic photoconductor was prepared in the same manner as in Example 1.

Example 6

First, 80.0 parts by mass of melamine resin (DIC Corporation, AMIDIR G-821-60, solid content ratio: 60%) and 70.0 parts by mass of acrylic resin (DIC Corporation, ACRYDIC 54-172-60, solid content ratio: 45%) as resin binders for undercoat layer, and 239.0 parts by mass of the zinc oxide particles (20 nm) surface-treated with amino acid salt A obtained in Production Example 1 as a filler for undercoat layer were added to a mixed solvent of 1500.0 parts by mass of methanol and 300.0 parts by mass of butanol to obtain a slurry. The mass ratio of filler to resin binder (F/B) in the slurry was 75/25. This slurry was used as in Example 1 to prepare an undercoat layer-coating solution, and an electrophotographic photoconductor was prepared in the same manner as in Example 1.

Example 7

An electrophotographic photoconductor was prepared in the same manner as in Example 1 except that the filler in the undercoat layer in Example 1 was changed to the zinc oxide particles (20 nm) surface-treated with amino acid salt A obtained in Production Example 2.

Example 8

An electrophotographic photoconductor was prepared in the same manner as in Example 1 except that the filler in the undercoat layer in Example 1 was changed to the zinc oxide particles (20 nm) surface-treated with amino acid salt A obtained in Production Example 3.

Example 9

An electrophotographic photoconductor was prepared in the same manner as in Example 1 except that the filler in the undercoat layer in Example 1 was changed to the zinc oxide particles (35 nm) surface-treated with amino acid salt A obtained in Production Example 4.

Example 10

An electrophotographic photoconductor was prepared in the same manner as in Example 1 except that the filler in the undercoat layer in Example 1 was changed to the zinc oxide particles (350 nm) surface-treated with amino acid salt A obtained in Production Example 10.

Example 11

An electrophotographic photoconductor was prepared in the same manner as in Example 1 except that the filler in the undercoat layer in Example 1 was changed to the zinc oxide particles (20 nm) surface-treated with amino acid salt B obtained in Production Example 5.

Example 12

An electrophotographic photoconductor was prepared in the same manner as in Example 1 except that the filler in the undercoat layer in Example 1 was changed to the zinc oxide particles (20 nm) surface-treated with amino acid C obtained in Production Example 6.

Example 13

An electrophotographic photoconductor was prepared in the same manner as in Example 1 except that the filler in the undercoat layer in Example 1 was changed to the zinc oxide particles (20 nm) surface-treated with amino acid salt D obtained in Production Example 7.

Comparative Example 1

An electrophotographic photoconductor was prepared in the same manner as in Example 1 except that the filler in the undercoat layer in Example 1 was changed to zinc oxide particles without surface treatment (Sakai Chemical Industry Co., Ltd., FINEX-50, average primary particle diameter: 20 nm).

Comparative Example 2

An electrophotographic photoconductor was prepared in the same manner as in Example 1 except that the filler in the undercoat layer in Example 1 was changed to the zinc oxide particles (20 nm) surface-treated with vinylsilane obtained in Production Example 8.

Comparative Example 3

An electrophotographic photoconductor was prepared in the same manner as in Example 1 except that the filler in the undercoat layer in Example 1 was changed to the zinc oxide particles (20 nm) treated with acrylic silane obtained in Production Example 9.

Comparative Example 4

An electrophotographic photoconductor was prepared in the same manner as in Example 1 except that the filler in the undercoat layer in Example 1 was changed to the titanium oxide particles (21 nm) surface-treated with aminosilane obtained in Production Example 11.

Example 14

An electrophotographic photoconductor was prepared in the same manner as in Example 1 except that the filler in the undercoat layer in Example 1 was changed to 47.8 parts by mass of the zinc oxide particles (20 nm) surface-treated with amino acid salt A obtained in Production Example 1 as a first filler (F1) and 191.2 parts by mass of the titanium oxide particles (21 nm) surface-treated with aminosilane obtained in Production Example 11 as a second filler (F2) (F1/F2=20/80).

Example 15

An electrophotographic photoconductor was prepared in the same manner as in Example 1 except that the filler in the undercoat layer in Example 1 was changed to 119.5 parts by mass of the zinc oxide particles (20 nm) surface-treated with amino acid salt A obtained in Production Example 1 as a first filler (F1) and 119.5 parts by mass of the titanium oxide particles (21 nm) surface-treated with aminosilane obtained in Production Example 11 as a second filler (F2) (F1/F2=50/50).

Example 16

An electrophotographic photoconductor was prepared in the same manner as in Example 1 except that the filler in the undercoat layer in Example 1 was changed to 191.2 parts by mass of the zinc oxide particles (20 nm) surface-treated with amino acid salt A obtained in Production Example 1 as a first filler (F1) and 47.8 parts by mass of the titanium oxide particles (21 nm) surface-treated with aminosilane obtained in Production Example 11 as a second filler (F2) (F1/F2=80/20).

Example 17

An electrophotographic photoconductor was prepared in the same manner as in Example 1 except that the filler in the undercoat layer in Example 1 was changed to 234.2 parts by mass of the zinc oxide particles (20 nm) surface-treated with amino acid salt A obtained in Production Example 1 as a first filler (F1) and 4.8 parts by mass of the titanium oxide particles (21 nm) surface-treated with aminosilane obtained in Production Example 11 as a second filler (F2) (F1/F2=98/2).

Example 18

An electrophotographic photoconductor was prepared in the same manner as in Example 15 except that the charge transport material used in Example 15 was changed to 10 parts by mass of a compound represented by the structural formula (5) below.

structural formula (5)

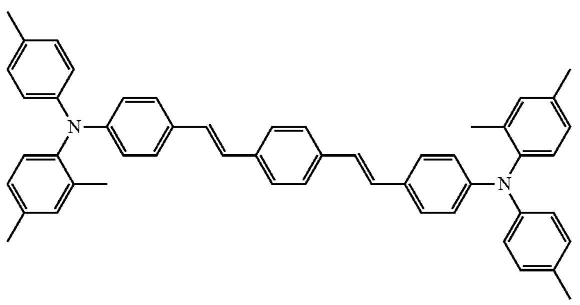

Example 19

An electrophotographic photoconductor was prepared in the same manner as in Example 15 except that the first filler (F1) used in Example 15 was changed to the zinc oxide particles (20 nm) surface-treated with amino acid salt B obtained in Production Example 5.

Example 20

An electrophotographic photoconductor was prepared in the same manner as in Example 15 except that the second filler (F2) used in Example 15 was changed to titanium oxide particles without surface treatment (Nippon Aerosil Co., Ltd., P25, average primary particle diameter: 21 nm).

Example 21

An electrophotographic photoconductor was prepared in the same manner as in Example 15 except that the second filler (F2) used in Example 15 was changed to titanium oxide particles (TAYCA Co., Ltd., MT-01, average primary particle diameter: 10 nm), and that aminosilane treatment was performed as in Production Example 11.

Example 22

An electrophotographic photoconductor was prepared in the same manner as in Example 15 except that the second filler (F2) used in Example 15 was changed to titanium oxide particles (TAYCA Co., Ltd., JR, average primary particle diameter: 270 nm), and that aminosilane treatment was performed as in Production Example 11.

Example 23

An electrophotographic photoconductor was prepared in the same manner as in Example 15 except that the second filler (F2) used in Example 15 was changed to zinc oxide particles without surface treatment (Sakai Chemical Industry Co., Ltd., FINEX-50, average primary particle diameter: 20 nm).

Example 24

An electrophotographic photoconductor was prepared in the same manner as in Example 15 except that the second filler (F2) used in Example 15 was changed to the zinc oxide particles (35 nm) surface-treated with amino acid salt A obtained in Production Example 4.

Example 25

An electrophotographic photoconductor was prepared in the same manner as in Example 15 except that the second filler (F2) used in Example 15 was changed to the zinc oxide particles (20 nm) surface-treated with amino acid salt D obtained in Production Example 7.

Example 26

An electrophotographic photoconductor was prepared in the same manner as in Example 15 except that the second filler (F2) used in Example 15 was changed to the zinc oxide particles (20 nm) surface-treated with amino acid salt B obtained in Production Example 5.

Example 27

An electrophotographic photoconductor was prepared in the same manner as in Example 1 except that the filler in the undercoat layer in Example 1 was changed to 95.7 parts by mass of the zinc oxide particles (20 nm) surface-treated with amino acid salt A obtained in Production Example 1 as a first filler (F1), 95.7 parts by mass of the zinc oxide particles (20 nm) surface-treated with amino acid salt B obtained in Production Example 5 as a second filler (F2), and 47.8 parts by mass of the zinc oxide particles (20 nm) surface-treated with amino acid C obtained in Production Example 6 as a third filler (F3) (F1/F2/F3=40/40/20).

(Example 28

An electrophotographic photoconductor was prepared in the same manner as in Example 27 except that the third filler (F3) used in Example 27 was changed to zinc oxide particles without surface treatment (Sakai Chemical Industry Co., Ltd., FINEX-50, average primary particle diameter: 20 nm).

Example 29

An electrophotographic photoconductor was prepared in the same manner as in Example 27 except that the third filler (F3) used in Example 27 was changed to the titanium oxide particles (21 nm) surface-treated with aminosilane obtained in Production Example 11.

Comparative Example 5

An electrophotographic photoconductor was prepared in the same manner as in Example 15 except that the first filler (F1) used in Example 15 was changed to zinc oxide particles without surface treatment (Sakai Chemical Industry Co., Ltd., FINEX-50, average primary particle diameter: 20 nm).

<Change Over Time of Undercoat Layer-Coating Solution>

The undercoat layer-coating solution was placed into a glass bottle and stored in a static state at normal temperature and humidity, and then visually observed over time to evaluate whether the filler was precipitated according to the following criteria:

□: No precipitation after 14 days;

○: No precipitation after 7 days, but slight precipitation observed after 14 days;

ΔNo precipitation after 2 days, but slight precipitation observed after 7 days; and x: Precipitation observed after 2 days.

As the performance of the photoconductor with respect to transfer, transfer ghosting and change in the charged potential were evaluated.

<Transfer Ghosting>

Figure 4:
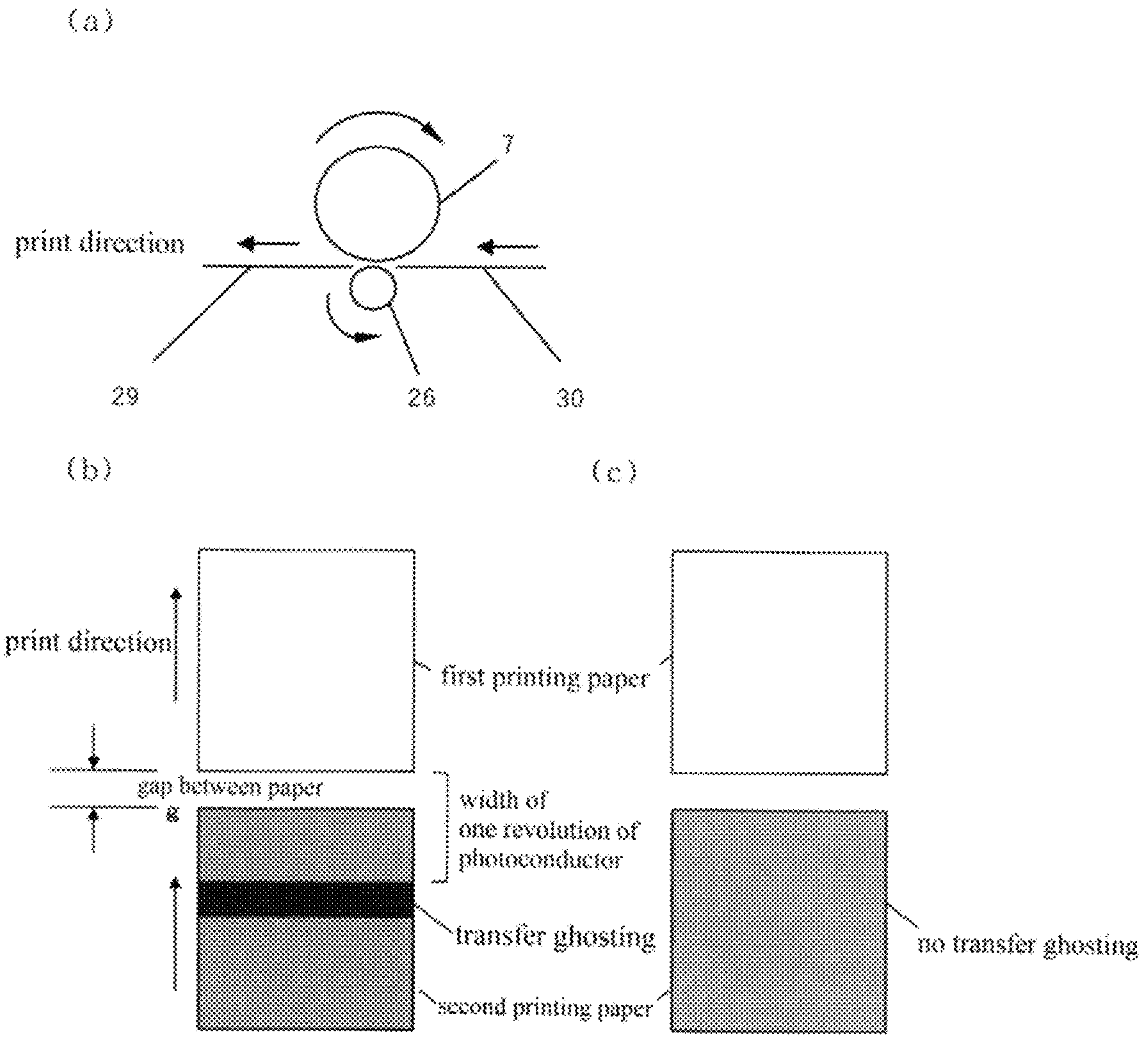
FIG. 4 is a schematic diagram illustrating the method of evaluating the transfer ghosting in Examples.

Electrophotographic photoconductors obtained in Examples 1 to 29 and Comparative Examples 1 to 5 were mounted on a commercially available printer (MultiXpress X7600LX™ manufactured by Samsung Electronics Co., Ltd.) for evaluation of printed images. FIG. 4 shows a schematic diagram illustrating the evaluation method.

As shown in FIG. 4(*a*), paper 29 and paper 30 are continuously inserted between the photoconductor 7 and the transfer charging device 26 in the printer, and a halftone image is printed on the second paper 30. When the second image is halftone, as shown in FIG. 4(*b*), a shading difference appears in the halftone image due to the transfer voltage between the first paper 29 and the second paper 30, which is called ghosting due to transfer (transfer ghosting).

For example, a transfer ghost appears as a band with shading at an interval W corresponding to one round of the photoconductor from the edge of the paper 29. The width of the band corresponds to the distance between the paper 29 and the paper 30 (gap between paper g). FIG. 4(*c*) shows an example without appearance of any transfer ghosts. Using the procedure, transfer ghosting was determined according to the following criteria:

□: Very good with no transfer ghosting;
○: No problem in actual use with very slight transfer ghosting;
Δ: Problematic in actual use with slight transfer ghosting; and
x: Transfer ghosting clearly observed.

<Charged Potential Difference>

Figure 3:
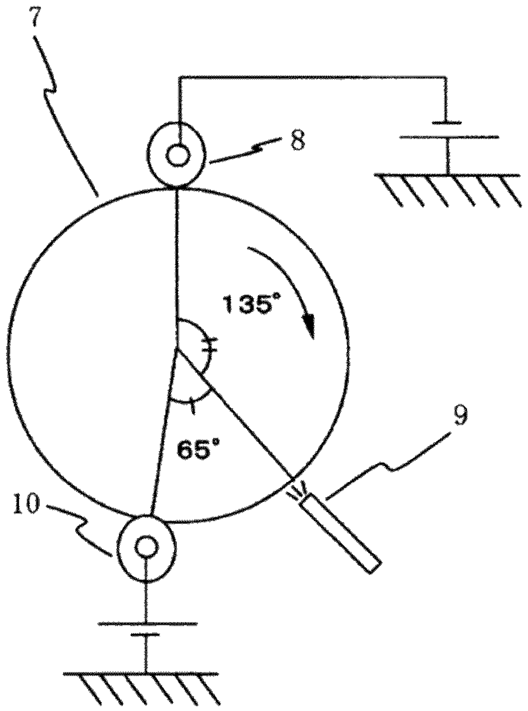
FIG. 3 is an explanatory diagram showing a configuration of the electrophotographic apparatus used to evaluate the charging potential difference in Examples.

Using a CYNTHIA 93 photoconductor drum electrical characteristic measurement system manufactured by Gentec Co., Ltd., the photoconductors were placed according to the arrangement shown in the illustration of the electrophotographic apparatus in FIG. 3. The symbols shown in the figure are 7: photoconductor, 8: charging roller, 9: electrometer, and 10: transfer roller. The photoconductor 7 charged to −600 V was rotated in the direction of the arrow in FIG. 3 at a peripheral speed of 100 mm/s, then for three revolutions with the transfer voltage set at 0 kV, and then for three revolutions with the transfer voltage increased to 0.2 kV. Thereafter, the transfer voltage was increased by 0.2 kV every three revolutions to 6.0 kV. The degree of transfer influence was determined by measuring the difference (ΔV0) between the charge potential of the photoconductor at a transfer voltage of 0 kV and the charge potential at the cycle immediately after the transfer voltage of 6.0 kV was applied. By applying a transfer voltage (6.0 kV) higher than that of printers and measuring ΔV0, the tendency of minor ghosting that cannot be detected in evaluation with printers can be evaluated. Since transfer ghosting in images tends to be less likely to occur when the charging potential difference ΔV0 is small, the degree of influence can be evaluated based on the size of ΔV0.

<Evaluation of Electrical Characteristics>

Electrophotographic photoconductors obtained in Examples 1 to 29 and Comparative Examples 1 to 5 were mounted on a black drum cartridge of a commercially available color printer (MultiXpress X7600LX™ manufactured by Samsung Electronics Co., Ltd.). Ten thousand sheets of A3 paper were printed in a test pattern with a printing rate of 1.1% using black toner, and the electrical characteristics of the electrophotographic photoconductor were measured before and after printing.

The surfaces of the photoconductors were charged to −650 V by corona discharge in the dark under an environment of a temperature of 22° C. and a humidity of 50%, and then the surface potential V0 immediately after charging was measured. Then, after leaving the photoconductors in the dark for 5 seconds, the surface potential V5 was measured, and the potential retention rate Vk5 (%) at 5 seconds after charging was calculated according to the following formula (1):

$$Vk5=V5/V0\times100 \quad (1).$$

Next, using a halogen lamp as a light source, an exposure light of 1.0 $\mu W/cm^2$ separated into 780 nm with a filter was irradiated to the photoconductor for 5 seconds at the time when the surface potential reached −600V. The exposure amount required for light attenuation until the surface potential reached −300 V was determined as E1/2 ($gcm^2$), and the residual potential of the surface of the photoconductor 5 seconds after the exposure was determined as VL (V). Then, the amount of decrease in retention rate ΔVk5 and the amount of increase in residual potential ΔVL were evaluated according to the following formulae:

amount of decrease in retention rate $\Delta Vk5=Vk5$ before printing$-Vk5$ after printing 10,000 sheets, and amount of increase in residual potential $\Delta VL=VL$ after printing 10,000 sheets$-VL$ *before printing*.

ΔVk5 indicates the degree of decrease in retention rate before and after the repeated printing. As this value becomes larger, the decrease in charge retention rate after the repeated printing is greater, and fogging on white paper is more likely to occur. ΔVL indicates the degree of increase in residual potential before and after the repeated printing. As this value becomes larger, the printing density is more likely to decrease.

The results are shown in the following Tables 3 and 4.

TABLE 1

| | Composition of undercoat layer | | | | | | | | |
|---|---|---|---|---|---|---|---|---|---|
| | First filler (F1) | | | | | | | | |
| | Name of metallic oxide | Primary particle diameter (nm) | Surface treatment agent Name | Surface treatment agent Amount (g) | Resin binder*[1] | | Filler/resin binder ratio (F/B) | Thickness of undercoat layer (μm) | Charge transport layer CTM |
| Ex. 1 | zinc oxide | 20 | amino acid salt A | 6 | resin A | resin B | 75/25 | 1.5 | (3) + (4) |
| Ex. 2 | zinc oxide | 20 | amino acid salt A | 6 | resin A | resin B | 75/25 | 0.1 | (3) + (4) |
| Ex. 3 | zinc oxide | 20 | amino acid salt A | 6 | resin A | resin B | 75/25 | 10.0 | (3) + (4) |
| Ex. 4 | zinc oxide | 20 | amino acid salt A | 6 | resin A | resin B | 35/65 | 1.5 | (3) + (4) |
| Ex. 5 | zinc oxide | 20 | amino acid salt A | 6 | resin A | resin B | 90/10 | 1.5 | (3) + (4) |
| Ex. 6 | zinc oxide | 20 | amino acid salt A | 6 | resin C | resin D | 75/25 | 1.5 | (3) + (4) |

TABLE 1-continued

| | Composition of undercoat layer: First filler (F1) Name of metallic oxide | Primary particle diameter (nm) | Surface treatment agent Name | Amount (g) | Resin binder*1 | | Filler/resin binder ratio (F/B) | Thickness of undercoat layer (μm) | Charge transport layer CTM |
|---|---|---|---|---|---|---|---|---|---|
| Ex. 7 | zinc oxide | 20 | amino acid salt A | 0.5 | resin A | resin B | 75/25 | 1.5 | (3) + (4) |
| Ex. 8 | zinc oxide | 20 | amino acid salt A | 10 | resin A | resin B | 75/25 | 1.5 | (3) + (4) |
| Ex. 9 | zinc oxide | 35 | amino acid salt A | 6 | resin A | resin B | 75/25 | 1.5 | (3) + (4) |
| Ex. 10 | zinc oxide | 350 | amino acid salt A | 6 | resin A | resin B | 75/25 | 1.5 | (3) + (4) |
| Ex. 11 | zinc oxide | 20 | amino acid salt B | 6 | resin A | resin B | 75/25 | 1.5 | (3) + (4) |
| Ex. 12 | zinc oxide | 20 | amino acid C | 6 | resin A | resin B | 75/25 | 1.5 | (3) + (4) |
| Ex. 13 | zinc oxide | 20 | amino acid salt D | 6 | resin A | resin B | 75/25 | 1.5 | (3) + (4) |
| Com. Ex. 1 | zinc oxide | 20 | none | — | resin A | resin B | 75/25 | 1.5 | (3) + (4) |
| Com. Ex. 2 | zinc oxide | 20 | vinylsilane | 6 | resin A | resin B | 75/25 | 1.5 | (3) + (4) |
| Com. Ex. 3 | zinc oxide | 20 | acrylic silane | 6 | resin A | resin B | 75/25 | 1.5 | (3) + (4) |
| Com. Ex. 4 | titanium oxide | 21 | aminosilane | 5 | resin A | resin B | 75/25 | 1.5 | (3) + (4) |

*1 resin A: polyvinylphenol resin, MARUKA LYNCUR MH-2 (Maruzen Petrochemical Co., Ltd.), resin B: melamine resin U-VAN ™ 2021 (Mitsui Chemicals, Inc.), resin C: melamine resin AMIDIR G-821-60 (DIC CORPORATION), resin D: acrylic resin ACRYDIC 54-172-60 (DIC CORPORATION)

TABLE 2

| | Composition of undercoat layer: First filler (F1) Name | Primary particle diameter (nm) | Surface treatment | Second filler (F2) Name | Primary particle diameter (nm) | Surface treatment | Third filler (F3) Name | Primary particle diameter (nm) | Surface treatment | Filler ratio F1/F2/F3 | Resin binder*1 | | Filler/resin binder ratio (F/B) | Thickness of undercoat layer (μm) | Charge transport layer CTM |
|---|---|---|---|---|---|---|---|---|---|---|---|---|---|---|---|
| Ex. 14 | zinc oxide | 20 | amino acid salt A | titanium oxide | 21 | amino-silane | — | — | — | 20/80/0 | resin A | resin B | 75/25 | 1.5 | (3) + (4) |
| Ex. 15 | zinc oxide | 20 | amino acid salt A | titanium oxide | 21 | amino-silane | — | — | — | 50/50/0 | resin A | resin B | 75/25 | 1.5 | (3) + (4) |
| Ex. 16 | zinc oxide | 20 | amino acid salt A | titanium oxide | 21 | amino-silane | — | — | — | 80/20/0 | resin A | resin B | 75/25 | 1.5 | (3) + (4) |
| Ex. 17 | zinc oxide | 20 | amino acid salt A | titanium oxide | 21 | amino-silane | — | — | — | 98/2/0 | resin A | resin B | 75/25 | 1.5 | (3) + (4) |
| Ex. 18 | zinc oxide | 20 | amino acid salt A | titanium oxide | 21 | amino-silane | — | — | — | 50/50/0 | resin A | resin B | 75/25 | 1.5 | (3) + (4) |
| Ex. 19 | zinc oxide | 20 | amino acid salt B | titanium oxide | 21 | amino-silane | — | — | — | 50/50/0 | resin A | resin B | 75/25 | 1.5 | (3) + (4) |
| Ex. 20 | zinc oxide | 20 | amino acid salt A | titanium oxide | 21 | none | — | — | — | 50/50/0 | resin A | resin B | 75/25 | 1.5 | (3) + (4) |
| Ex. 21 | zinc oxide | 20 | amino acid salt A | titanium oxide | 10 | amino-silane | — | — | — | 50/50/0 | resin A | resin B | 75/25 | 1.5 | (3) + (4) |
| Ex. 22 | zinc oxide | 20 | amino acid salt A | titanium oxide | 270 | amino-silane | — | — | — | 50/50/0 | resin A | resin B | 75/25 | 1.5 | (3) + (4) |
| Ex. 23 | zinc oxide | 20 | amino acid salt A | zinc oxide | 20 | none | — | — | — | 50/50/0 | resin A | resin B | 75/25 | 1.5 | (3) + (4) |
| Ex. 24 | zinc oxide | 20 | amino acid salt A | zinc oxide | 35 | amino acid salt A | — | — | — | 50/50/0 | resin A | resin B | 75/25 | 1.5 | (3) + (4) |
| Ex. 25 | zinc oxide | 20 | amino acid salt A | zinc oxide | 20 | amino acid salt D | — | — | — | 50/50/0 | resin A | resin B | 75/25 | 1.5 | (3) + (4) |
| Ex. 26 | zinc oxide | 20 | amino acid salt A | zinc oxide | 20 | amino acid salt B | — | — | — | 50/50/0 | resin A | resin B | 75/25 | 1.5 | (3) + (4) |
| Ex. 27 | zinc oxide | 20 | amino acid salt A | zinc oxide | 20 | amino acid salt B | zinc oxide | 20 | amino acid salt C | 40/40/20 | resin A | resin B | 75/25 | 1.5 | (3) + (4) |

TABLE 2-continued

| | Composition of undercoat layer: First filler (F1) Name | First filler (F1) Primary particle diameter (nm) | First filler (F1) Surface treatment | Second filler (F2) Name | Second filler (F2) Primary particle diameter (nm) | Second filler (F2) Surface treatment | Third filler (F3) Name | Third filler (F3) Primary particle diameter (nm) | Third filler (F3) Surface treatment | Filler ratio F1/F2/F3 | Resin binder*[1] | | Filler/resin binder ratio (F/B) | Thickness of undercoat layer (μm) | Charge transport layer CTM |
|---|---|---|---|---|---|---|---|---|---|---|---|---|---|---|---|
| Ex. 28 | zinc oxide | 20 | amino acid salt A | zinc oxide | 20 | amino acid salt B | zinc oxide | 20 | none | 40/40/20 | resin A | resin B | 75/25 | 1.5 | (3) + (4) |
| Ex. 29 | zinc oxide | 20 | amino acid salt A | zinc oxide | 20 | amino acid salt B | titanium oxide | 21 | amino-silane | 40/40/20 | resin A | resin B | 75/25 | 1.5 | (3) + (4) |
| Com. Ex. 5 | zinc oxide | 20 | none | titanium oxide | 21 | amino-silane | — | — | — | 50/50/0 | resin A | resin B | 75/25 | 1.5 | (3) + (4) |

TABLE 3

| | Change over time in undercoat layer-coating solution | Transfer performance: Charged potential difference between cases in presence and absence of transfer voltage ΔV0 | Transfer ghosting in images | Change in electrical characteristics before and after repeated printing: Decrease in retention rate ΔVk5 | Increase in residual potential ΔVL |
|---|---|---|---|---|---|
| Ex. 1 | ◎ | 14 | ○ | 0.7 | 13 |
| Ex. 2 | ◎ | 13 | ○ | 3.0 | 28 |
| Ex. 3 | ○ | 15 | ○ | 1.0 | 35 |
| Ex. 4 | ◎ | 16 | ○ | 2.9 | 36 |
| Ex. 5 | ○ | 17 | ○ | 5.0 | 12 |
| Ex. 6 | ◎ | 13 | ○ | 1.9 | 22 |
| Ex. 7 | ○ | 25 | ○ | 0.8 | 19 |
| Ex. 8 | ◎ | 18 | ○ | 1.9 | 12 |
| Ex. 9 | ◎ | 16 | ○ | 0.8 | 16 |
| Ex. 10 | ○ | 25 | ○ | 3.0 | 26 |
| Ex. 11 | ◎ | 20 | ○ | 0.7 | 10 |
| Ex. 12 | ◎ | 18 | ○ | 2.5 | 25 |
| Ex. 13 | ◎ | 15 | ○ | 1.5 | 18 |
| Com. Ex. 1 | X | 41 | X | 6.0 | 28 |
| Com. Ex. 2 | Δ | 45 | X | 8.0 | 36 |
| Com. Ex. 3 | Δ | 51 | X | 7.5 | 44 |
| Com. Ex. 4 | ◎ | 24 | Δ | 3.1 | 32 |

TABLE 4

| | Change over time in undercoat layer-coating solution | Transfer performance: Charged potential difference between cases in presence and absence of transfer voltage ΔV0 | Transfer ghosting in images | Change in electrical characteristics before and after repeated printing: Decrease in retention rate ΔVk5 | Increase in residual potential ΔVL |
|---|---|---|---|---|---|
| Ex. 14 | ◎ | 14 | ◎ | 0.9 | 10 |
| Ex. 15 | ◎ | 5 | ◎ | 0.2 | 4 |
| Ex. 16 | ◎ | 8 | ◎ | 0.5 | 9 |
| Ex. 17 | ◎ | 11 | ◎ | 0.6 | 13 |
| Ex. 18 | ◎ | 4 | ◎ | 0.4 | 3 |
| Ex. 19 | ◎ | 6 | ◎ | 0.3 | 8 |
| Ex. 20 | ○ | 24 | ○ | 1.1 | 20 |
| Ex. 21 | ◎ | 12 | ◎ | 0.8 | 5 |
| Ex. 22 | ○ | 18 | ◎ | 1.2 | 19 |
| Ex. 23 | ○ | 11 | ○ | 0.5 | 11 |
| Ex. 24 | ◎ | 8 | ○ | 0.7 | 10 |

TABLE 4-continued

| | Change over time in undercoat layer-coating solution | Transfer performance: Charged potential difference between cases in presence and absence of transfer voltage ΔV0 | Transfer ghosting in images | Change in electrical characteristics before and after repeated printing: Decrease in retention rate ΔVk5 | Increase in residual potential ΔVL |
|---|---|---|---|---|---|
| Ex. 25 | ◎ | 18 | ○ | 1.0 | 18 |
| Ex. 26 | ◎ | 9 | ○ | 0.6 | 9 |
| Ex. 27 | ◎ | 7 | ○ | 0.4 | 8 |
| Ex. 28 | ○ | 8 | ○ | 0.5 | 10 |
| Ex. 29 | ◎ | 9 | ◎ | 0.4 | 11 |
| Com. Ex. 5 | Δ | 31 | Δ | 2.1 | 25 |

The results shown in Tables 1 to 4 above demonstrated that zinc oxide particles surface-treated with an N-acylated amino acid or a salt thereof can be used as a filler in the undercoat layer to provide a photoconductor with less transfer ghosting. Furthermore, the use of zinc oxide particles surface-treated with an N-acylated amino acid or a salt thereof as a filler in combination with other metallic oxide particles in the undercoat layer resulted in obtaining a photoconductor with excellent transfer performance and electrical characteristics. In particular, the results of Examples 14 to 19, 21, 22, and 29 show that the use of the combination of zinc oxide particles surface-treated with an N-acylated amino acid or a salt thereof and titanium oxide particles surface-treated with an aminosilane compound as fillers can provide a photoconductor causing less ghosts and having a superior effect of reducing transfer ghosting in images.

The undercoat layer-coating solution according to Examples all have good coating solution stability, and can provide a photoconductor that is stable in production with less production processing such as redispersion and filtration to break up precipitates. In all of Examples, it was demonstrated that a photoconductor was obtained, with excellent stability of the potential retention rate of the surface of the photoconductor before and after repeated printing, and with sufficient prevention of increase in the residual potential on the surface of the photoconductor.

In contrast, it was demonstrated that since the photoconductors in Comparative Examples used metallic oxide particles other than zinc oxide particles surface-treated with an N-acylated amino acid or a salt thereof as a filler, it showed insufficient prevention of transfer ghosting, as well as insufficient coating solution stability, transfer performance, and electrical characteristics.

(Production of Positively-charged Single-layer Photoconductor)

Example 30

The undercoat layer-coating solution prepared as in Example 1 was dip coated on the outer periphery of an aluminum cylinder with an outer diameter of 24 mm as a conductive substrate 1, and then dried at 135° C. for 20 min to form an undercoat layer with a thickness of 0.5 μm.

On the undercoat layer, 1.5 parts by mass of metal-free phthalocyanine represented by the following formula as a charge generation material:

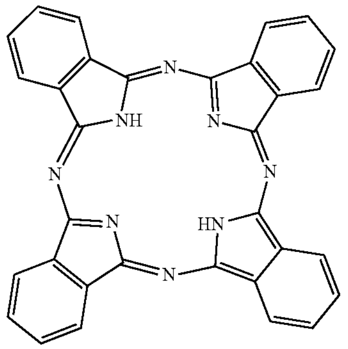 [SMILES: c1ccc2c(c1)-c1nc-2nc2[nH]c(nc3nc(nc4[nH]c(n1)c1ccccc41)-c1ccccc1-3)c1ccccc21]

45 parts by mass of stilbene compound represented by the following formula as a charge transport material:

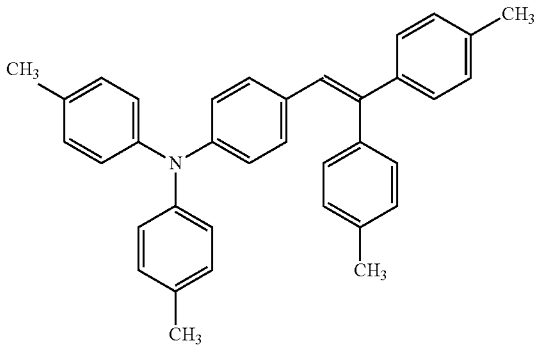

35 parts by mass of a compound represented by the following formula as an electron transport material:

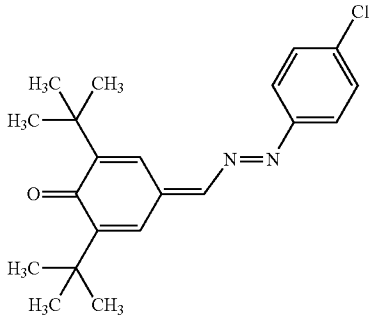 [SMILES: CC(C)(C)C1=CC(=C/N=N/c2ccc(Cl)cc2)C=C(C(C)(C)C)C1=O]

and 130 parts by mass of polycarbonate resin (Mitsubishi Gas Chemical Company, IUPIZETA™ PCZ-500) as a resin binder were dissolved and dispersed in 850 parts by mass of tetrahydrofuran to prepare a photosensitive layer-coating solution. Then, the photosensitive layer-coating solution was dip coated and dried at 100° C. for 60 min to form a photosensitive layer with a thickness of 25 μm, thereby preparing a single-layer electrophotographic photoconductor.

Example 31

A single-layer electrophotographic photoconductor was prepared in the same manner as in Example 30 except that the undercoat layer was changed to an undercoat layer as in Example 11.

Example 32

A single-layer electrophotographic photoconductor was prepared in the same manner as in Example 30 except that the undercoat layer was changed to an undercoat layer as in Example 12.

Example 33

A single-layer electrophotographic photoconductor was prepared in the same manner as in Example 30 except that the undercoat layer was changed to an undercoat layer as in Example 13.

Example 34

A single-layer electrophotographic photoconductor was prepared in the same manner as in Example 30 except that the undercoat layer was changed to an undercoat layer as in Example 26.

Example 35

A single-layer electrophotographic photoconductor was prepared in the same manner as in Example 30 except that the undercoat layer was changed to an undercoat layer as in Example 15.

Comparative Example 6

A single-layer electrophotographic photoconductor was prepared in the same manner as in Example 30 except that the undercoat layer was changed to an undercoat layer as in Comparative Example 1.

Comparative Example 7

A single-layer electrophotographic photoconductor was prepared in the same manner as in Example 30 except that the undercoat layer was changed to an undercoat layer as in Comparative Example 2.

Comparative Example 8

A single-layer electrophotographic photoconductor was prepared in the same manner as in Example 30 except that the undercoat layer was changed to an undercoat layer as in Comparative Example 3.

Comparative Example 9

A single-layer electrophotographic photoconductor was prepared in the same manner as in Example 30 except that the undercoat layer was changed to an undercoat layer as in Comparative Example 4.

Comparative Example 10

A single-layer electrophotographic photoconductor was prepared in the same manner as in Example 30 except that the undercoat layer was changed to an undercoat layer as in Comparative Example 5.

<Charging Potential Difference>

Using a CYNTHIA 93 photoconductor drum electrical characteristic measurement system manufactured by Gentec Co., Ltd., the photoconductors were placed according to the arrangement shown in the illustration of the electrophotographic apparatus in FIG. 3. The symbols shown in the figure are 7: photoconductor, 8: charging roller, 9: electrometer, and 10: transfer roller. The photoconductor 7 charged to +600 V was rotated in the direction of the arrow in FIG. 3 at a peripheral speed of 100 mm/s, then for three revolutions with the transfer voltage set at 0 kV, and then for three revolutions with the transfer voltage decreased to −0.2 kV. Thereafter, the transfer voltage was decreased by −0.2 kV every three revolutions to −6.0 kV. The degree of transfer influence was determined by measuring the difference between the charge potential of the photoconductor at a transfer voltage of 0 kV and the charge potential at the cycle immediately after the transfer voltage of −6.0 kV was applied. As this charged potential difference (absolute value) is larger, transfer ghosting in images tends to be more easily visible.

The results are shown in the following Table 6.

TABLE 5

| | Composition of undercoat layer (UCL) | | | | | | |
|---|---|---|---|---|---|---|---|
| | First filler (F1) | | | Second filler (F2) | | | |
| | Name | Primary particle diameter (nm) | Surface treatment | Name | Primary particle diameter (nm) | Surface treatment | Filler ratio F1/F2 |
| Ex. 30 | zinc oxide | 20 | amino acid salt A | — | — | — | 100/0 |
| Ex. 31 | zinc oxide | 20 | amino acid salt B | — | — | — | 100/0 |
| Ex. 32 | zinc oxide | 20 | amino acid C | — | — | — | 100/0 |
| Ex. 33 | zinc oxide | 20 | amino acid salt D | — | — | — | 100/0 |
| Ex. 34 | zinc oxide | 20 | amino acid salt A | zinc oxide | 20 | amino acid salt B | 50/50 |
| Ex. 35 | zinc oxide | 20 | amino acid salt A | titanium oxide | 21 | aminosilane | 50/50 |
| Com. Ex. 6 | zinc oxide | 20 | none | — | — | — | 100/0 |
| Com. Ex. 7 | zinc oxide | 20 | vinylsilane | — | — | — | 100/0 |
| Com. Ex. 8 | zinc oxide | 20 | acrylic silane | — | — | — | 100/0 |
| Com. Ex. 9 | titanium oxide | 21 | aminosilane | — | — | — | 100/0 |
| Com. Ex. 10 | zinc oxide | 20 | none | titanium oxide | 21 | aminosilane | 50/50 |

TABLE 6

| | Transfer performance Charged potential difference between cases in presence and absence of transfer voltage ΔV0 |
|---|---|
| Ex. 30 | 9 |
| Ex. 31 | 16 |
| Ex. 32 | 15 |
| Ex. 33 | 18 |
| Ex. 34 | 15 |
| Ex. 35 | 7 |
| Com. Ex. 6 | 36 |
| Com. Ex. 7 | 41 |
| Com. Ex. 8 | 33 |
| Com. Ex. 9 | 20 |
| Com. Ex. 10 | 29 |

The results shown in Tables 5 to 6 above demonstrated that, even for positively-charged photoconductor, zinc oxide particles surface-treated with an N-acylated amino acid or a salt thereof can be used alone or in combination of other metallic oxide particles as a filler(s) in the undercoat layer to provide a photoconductor that is considered to be less susceptible to transfer voltage and less prone to transfer ghosting. In particular, the results of Example 35 show that the use of the combination of zinc oxide particles surface-treated with an N-acylated amino acid or a salt thereof and titanium oxide particles surface-treated with an aminosilane compound as fillers can provide a superior photoconductor that is less susceptible to transfer voltage.

(Production of Positively-Charged Multi-Layer Photoconductor)

Example 36

The undercoat layer-coating solution prepared as in Example 1 was dip coated on the outer periphery of an aluminum cylinder with an outer diameter of 24 mm as a conductive substrate 1, and then dried at 135° C. for 20 min to form an undercoat layer with a thickness of 0.5 μm.

Five parts by mass of polycarbonate resin (Mitsubishi Gas Chemical Company, IUPIZETA™ PCZ-500) as a resin binder and 5 parts by mass of the charge transport material used in Example 30 were dissolved in 80 parts by mass of tetrahydrofuran to prepare a charge transport layer-coating solution. The charge transport layer-coating solution was dip coated on the outer periphery of a conductive substrate coated with an undercoat layer and dried at 120° C. for 60 min to form a charge transport layer with a thickness of 15 μm.

Then, 0.1 parts by mass of Y-titanyl phthalocyanine as a charge generation material, 2 parts by mass of the charge transport material used in Example 30 as a hole transport material, 5 parts by mass of the compound used in Example 30 as an electron transport material, and 13 parts by mass of polycarbonate resin (Mitsubishi Gas Chemical Company, IUPIZETA™ PCZ-500) as a resin binder were dissolved and dispersed in 120 parts by mass of 1,2-dichloroethane to prepare a charge generation layer-coating solution. The charge generation layer-coating solution was dip coated on the charge transport layer, and dried at 100° C. for 60 min to form a charge generation layer with a thickness of 15 μm, thereby preparing a positively-charged multi-layer electrophotographic photoconductor.

Example 37

A positively-charged multi-layer electrophotographic photoconductor was prepared in the same manner as in Example 36 except that the undercoat layer was changed to an undercoat layer as in Example 15.

Comparative Example 11

A positively-charged multi-layer electrophotographic photoconductor was prepared in the same manner as in Example 36 except that the undercoat layer was changed to an undercoat layer as in Comparative Example 1.

Comparative Example 12

A positively-charged multi-layer electrophotographic photoconductor was prepared in the same manner as in Example 36 except that the undercoat layer was changed to an undercoat layer as in Comparative Example 4.

Comparative Example 13

A positively-charged multi-layer electrophotographic photoconductor was prepared in the same manner as in Example 36 except that the undercoat layer was changed to an undercoat layer as in Comparative Example 5.

<Charging Potential Difference>

Using a photoconductor drum electrical characteristic measurement system manufactured by Gentec Co., Ltd., CYNTHIA 93, the photoconductors were placed according to the arrangement shown in the illustration of the electrophotographic apparatus in FIG. 3. The symbols shown in the figure are 7: photoconductor, 8: charging roller, 9: electrometer, and 10: transfer roller. The photoconductor 7 charged to +600 V was rotated in the direction of the arrow in FIG. 3 at a peripheral speed of 100 mm/s, then for three revolutions with the transfer voltage set at 0 kV, and then for three revolutions with the transfer voltage decreased to −0.2 kV. Thereafter, the transfer voltage was decreased by −0.2 kV every three revolutions to −6.0 kV. The degree of transfer influence was determined by measuring the difference between the charge potential of the photoconductor at a transfer voltage of 0 kV and the charge potential at the cycle immediately after the transfer voltage of −6.0 kV was applied. As this charged potential difference (absolute value) is larger, transfer ghosting in images tends to be more easily visible.

The results are shown in the following Table 8.

TABLE 7

| | Composition of undercoat layer (UCL) | | | | | | |
|---|---|---|---|---|---|---|---|
| | First filler (F1) | | | Second filler (F2) | | | |
| | Name | Primary particle diameter (nm) | Surface treatment | Name | Primary particle diameter (nm) | Surface treatment | Filler ratio F1/F2 |
| Ex. 36 | zinc oxide | 20 | amino acid salt A | — | — | — | 100/0 |
| Ex. 37 | zinc oxide | 20 | amino acid salt A | titanium oxide | 21 | aminosilane | 50/50 |
| Com. Ex. 11 | zinc oxide | 20 | no treatment | — | — | — | 100/0 |
| Com. Ex. 12 | titanium oxide | 21 | aminosilane | — | — | — | 100/0 |
| Com. Ex. 13 | zinc oxide | 20 | no treatment | titanium oxide | 21 | aminosilane | 50/50 |

TABLE 8

| | Transfer performance Charged potential difference between cases in presence and absence of transfer voltage ΔV0 |
|---|---|
| Ex. 36 | 13 |
| Ex. 37 | 8 |
| Com. Ex. 11 | 38 |
| Com. Ex. 12 | 22 |
| Com. Ex. 13 | 34 |

The results shown in Tables 7 to 8 above demonstrated that zinc oxide particles surface-treated with an N-acylated amino acid or a salt thereof can be used alone or in combination of other metallic oxide particles as a filler(s) in the undercoat layer to provide a photoconductor that is considered to be less susceptible to transfer voltage and less prone to transfer ghosting. In particular, the results of Example 37 show that the use of the combination of zinc oxide particles surface-treated with an N-acylated amino acid or a salt thereof and titanium oxide particles surface-treated with an aminosilane compound as fillers can provide a superior photoconductor that is less susceptible to transfer voltage.

Thus, it was demonstrated that zinc oxide particles surface-treated with an N-acylated amino acid or a salt thereof can be used alone or in combination of other metallic oxide particles as a filler(s) in the undercoat layer to provide a photoconductor that does not cause transfer ghosting and has excellent transfer performance and electrical performance.

DESCRIPTION OF SYMBOLS

1 conductive substrate
2 undercoat layer
3 single-layer photosensitive layer
4 charge generation layer
5 charge transport layer
7 photoconductor
8 charging roller
9 electrometer
10 transfer roller
21 charging member
22 high-voltage power supply
23 image exposure member (exposure light source)
24 development device
241 developer roller
25 paper feed
251 paper feed roller
252 paper feed guide
26 transfer charging device (direct charging)
27 cleaner
271 cleaning blade
28 discharging member
29 paper (first printing)
30 paper (second printing)
60 electrophotographic apparatus
300 photosensitive layer

The invention claimed is:

1. An electrophotographic photoconductor, comprising:
a conductive substrate;
an undercoat layer that is provided on the conductive substrate and comprises a resin binder, a first filler, and a second filler; and
a photosensitive layer that is provided on the undercoat layer, wherein
the first filler is zinc oxide particles that are surface-treated with an N-acylated amino acid or an N-acylated amino acid salt,
the second filler includes titanium oxide particles that are surface-treated with an aminosilane compound, and
an amount of the zinc oxide particles surface-treated with the N-acylated amino acid or the N-acylated amino acid salt with respect to a total amount of fillers including the first filler and the second filler is 20% by mass or more and 80% by mass or less.

2. The electrophotographic photoconductor according to claim 1, wherein the zinc oxide particles that are surface-treated have an average primary particle diameter ranging from 1 nm to 350 nm.

3. The electrophotographic photoconductor according to claim 1, wherein the resin binder comprises a resin selected from the group consisting of acrylic resins, melamine resins, polyvinylphenol resins, and combinations of two or more thereof.

4. The electrophotographic photoconductor according to claim 1, wherein a mass ratio of the first filler to the resin binder in the undercoat layer ranges from 50/50 to 90/10.

5. The electrophotographic photoconductor according to claim 1, wherein the first filler and the second filler have a combined mass and a mass ratio of the combined mass to the resin binder in the undercoat layer ranges from 50/50 to 90/10.

6. The electrophotographic photoconductor according to claim 1, wherein the photosensitive layer comprises a charge generation material that is selected from the group consisting of titanyl phthalocyanine, metal-free phthalocyanine, and combinations thereof.

7. The electrophotographic photoconductor according to claim 1, wherein the photosensitive layer is a multi-layer photosensitive layer comprising a charge generation layer and a charge transport layer.

8. The electrophotographic photoconductor according to claim 1, wherein the photosensitive layer is a single-layer photosensitive layer having a single layer comprising a charge generation material and a charge transport material.

9. A method of manufacturing the electrophotographic photoconductor according to claim 1, comprising:
preparing a coating solution for the undercoat layer comprising the zinc oxide particles that are surface-treated with an N-acylated amino acid or a salt thereof; and
applying the coating solution to the conductive substrate to form the undercoat layer thereon.

10. An electrophotographic apparatus comprising the electrophotographic photoconductor according to claim 1.

* * * * *